(12) United States Patent
Romeo et al.

(10) Patent No.: US 12,138,681 B2
(45) Date of Patent: Nov. 12, 2024

(54) CONTINUOUS CASTING MACHINE AND METHOD FOR BIPOLAR BATTERY FOILS AND BATTERY GRIDS

(71) Applicant: Wirtz Manufacturing Company, Inc., Port Huron, MI (US)

(72) Inventors: Michael R. Romeo, St. Clair, MI (US); Jason P. Miller, Cottrellville, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 0 days.

(21) Appl. No.: 18/211,871

(22) Filed: Jun. 20, 2023

(65) Prior Publication Data

US 2023/0405667 A1 Dec. 21, 2023

Related U.S. Application Data

(60) Provisional application No. 63/353,749, filed on Jun. 20, 2022.

(51) Int. Cl.
*B22D 11/04* (2006.01)
*B22D 11/00* (2006.01)
(Continued)

(52) U.S. Cl.
CPC ........ *B22D 11/0405* (2013.01); *B22D 11/001* (2013.01); *B22D 11/06* (2013.01); *B22D 11/144* (2013.01); *B22D 11/22* (2013.01)

(58) Field of Classification Search
CPC .. H01M 4/73; B22D 11/0602; B22D 11/0648; B22D 11/0651; B22D 11/0654;
(Continued)

(56) References Cited

U.S. PATENT DOCUMENTS 3,300,821 A 1/1967 Nichols et al.
10,981,218 B2 4/2021 Romeo et al.
(Continued)

FOREIGN PATENT DOCUMENTS

GB 803488 A 10/1958
JP H04294845 A 10/1992
JP H057999 A 1/1993

OTHER PUBLICATIONS

International Search Report for International Application No. PCT/US23/25744 dated Jan. 10, 2024 (4 pages).
(Continued)

*Primary Examiner* — Kevin P Kerns
*Assistant Examiner* — Steven S Ha
(74) *Attorney, Agent, or Firm* — REISING ETHINGTON, P.C.

(57) ABSTRACT

Equipment and a machine and a process for continuously casting strips of battery foils and/or strips of battery grids. The battery foils and grids are composed of lead or a lead alloy material. The foils, in particular, can be employed as current collectors in bipolar batteries. The machine, per an implementation, has a mold ring, a movable belt, one or more rollers, and one or more shoes. The mold ring rotates and has a mold cavity. The mold cavity can establish foil molds or grid molds. The movable belt moves about the roller(s) with a face in confrontation with the mold ring. The shoe(s) urges the movable belt into engagement with the mold ring. Liquid lead is delivered to the mold cavity adjacent the location in which the movable belt engages the mold ring amid use of the machine.

24 Claims, 30 Drawing Sheets

(51) Int. Cl.
  *B22D 11/06*   (2006.01)
  *B22D 11/14*   (2006.01)
  *B22D 11/22*   (2006.01)

(58) Field of Classification Search
  CPC ............ B22D 11/0677; B22D 11/0685; B22D 11/0694
  See application file for complete search history.

(56) References Cited

U.S. PATENT DOCUMENTS

2020/0338631 A1  10/2020  Romeo et al.
2022/0190312 A1  6/2022   Mendoza et al.

OTHER PUBLICATIONS

Written Opinion for International Application No. PCT/US23/25744 dated Jan. 10, 2024 (10 pages).

CONTINUOUS CASTING MACHINE AND METHOD FOR BIPOLAR BATTERY FOILS AND BATTERY GRIDS

CROSS-REFERENCE TO RELATED APPLICATION

This application claims the benefit of U.S. Provisional Patent Application No. 63/353,749, with a filing date of Jun. 20, 2022, the contents of which are hereby incorporated by reference in their entirety.

TECHNICAL FIELD

This disclosure relates generally to equipment for bipolar and lead-acid battery manufacture and, more particularly, to a machine and a method for continuously casting foils composed of lead or a lead alloy material (hereafter, "lead") and employed as current collectors in bipolar batteries, and/or for continuously casting battery grids of lead.

BACKGROUND

Batteries with bipolar architectures can be used for automotive, traction, and stationary applications, as well as any other platform that utilizes lead-acid battery technology as its primary energy storage means. Compared to prismatic lead-acid batteries, bipolar batteries generally offer reductions in manufacturing cost, product weight, and recharge time, while providing increased duty cycle and battery longevity. Bipolar battery architecture is chemistry agnostic, but most state-of-the-art bipolar batteries are of the lead-acid type.

Bipolar batteries have individual electrochemical cell compartments that are isolated by current collectors and are arranged electrically in series. Current flows perpendicular relative to a surface of the current collectors, in contrast to the more traditional prismatic architectures, for example, in which current flows parallel relative to a surface of the associated electrode. Each current collector—also called a bipole—has positive electrochemically active material situated on one of its sides, and has negative electrochemically active material situated on its other, opposite side. Current collectors can take various forms, including in the form of a thin foil composed of a lead or a lead alloy material. Still, effective and efficient commercial mass production of thin foils for use as current collectors remains a challenge for industry.

Furthermore, with respect to battery grids, the making of lead grids and particularly positive grids is conventionally one of the most critical parts of manufacturing commercially acceptable lead acid batteries. Making satisfactory positive lead grids typically requires considerable metallurgic microstructure control to produce positive grids having a combination of satisfactory mechanical strength, corrosion resistance, creep resistance, and paste adhesion. Thus, the particular lead alloy and method of making battery grids is carefully chosen based on the specific performance characteristics needed for a specific grid.

SUMMARY

In an embodiment, a machine is provided that continuously casts a strip of a plurality of connected bipolar battery foils. The machine may include a mold ring and a movable belt. The mold ring can be rotated about an axis. The mold ring has a mold cavity that resides at a cylindrical outer surface of the mold ring. The mold cavity has a multitude of foil molds. Each foil mold has a multitude of protrusions, has a multitude of depression molds, or has both a multitude of protrusions and a multitude of depression molds, depending on the implementation. The mold ring has a runner system that fluidly communicates with the mold cavity in order to ease the delivery flow of liquid lead to the mold cavity amid use of the machine. The movable belt has a face that is situated in general confrontation with a circumferential region of the mold cavity. Liquid lead delivered to the mold cavity by way of the runner system flows between the face of the movable belt and the mold cavity of the mold ring.

In an embodiment, a method and a process is provided that continuously casts a strip of a plurality of connected bipolar battery foils. The method may have multiple steps that can be performed in varying sequences. In an implementation, one step may involve rotating a mold ring about an axis. The mold ring has a mold cavity. The mold cavity resides at a cylindrical outer surface of the mold ring. The mold cavity has a multitude of foil molds. Each foil mold has a multitude of protrusions, has a multitude of depression molds, or has both a multitude of protrusions and a multitude of depression molds, depending on the implementation. The mold ring has a runner system that fluidly communicates with the mold cavity in order to ease the delivery flow of liquid lead to the mold cavity. Another step of the method may involve moving a belt over a circumferential region of the mold cavity of the mold ring. Yet another step of the method may involve supplying liquid lead to the mold cavity by way of the runner system at the circumferential region.

In an embodiment, a machine is provided that continuously casts a strip of a plurality of connected battery grids or a plurality of connected battery foils, depending on the implementation and intended use. The machine may include a mold ring, a movable belt, a first roller, a second roller, a heating shoe, a cooling shoe, and a platform. The mold ring can be rotated about an axis. The mold ring has a mold cavity that resides at a cylindrical outer surface of the mold ring. The mold cavity has a multitude of grid molds or has a multitude of foil molds. The mold ring has a runner system that fluidly communicates with the mold cavity. The runner system has a multitude of ribs. The runner system and the ribs ease delivery flow of liquid lead to the mold cavity amid use of the machine. The movable belt has a face that is situated in general confrontation with a circumferential region of the mold cavity. The first roller supports the movable belt in general confrontation with the circumferential region of the mold cavity, and the second roller similarly supports the movable belt in general confrontation with the circumferential region of the mold cavity. The heating shoe engages the movable belt near a location where liquid lead is delivered to the mold cavity. The cooling shoe is situated circumferentially next to, and hence neighbors, the heating shoe. The cooling shoe engages the movable belt. The platform carries both of the heating shoe and the cooling shoe. The platform can be moved with respect to the mold ring. When moved, the platform simultaneously brings the heating and cooling shoes toward and away from the mold ring.

BRIEF DESCRIPTION OF THE DRAWINGS

The following detailed description of embodiments and best mode is set forth with reference to the accompanying drawings in which.

DETAILED DESCRIPTION

A method of continuously casting a strip of a multitude of serially-connected bipolar battery foils that can be employed as current collectors in bipolar batteries, per an embodiment, may include providing a supply of molten or liquid lead; moving a mold ring with serially-connected bipolar battery foil mold cavities relative to the supply to successively fill the mold cavities with liquid lead; solidifying the liquid lead in each mold cavity to form a portion of the strip of serially-connected bipolar battery foils; and removing a solidified portion of the strip of serially-connected bipolar battery foils from one or more mold cavities of the mold ring downstream of the location of supplying liquid lead to the mold cavities while upstream thereof supplying liquid lead to part or more of another mold cavity of the mold ring. Still, the method and constructions described below may be implemented to continuously cast a strip of a plurality of serially-connected lead or lead alloy (collectively referred to hereafter as "lead") battery grids. In at least some applications of the method the mold ring may have a whole number of mold cavities collectively spanning wholly around a periphery of the mold ring and an axis disposed substantially vertically on which the mold ring is rotated. In at least some applications of the method the mold ring may have a runner system fluidly communicating with an upper axial end of the mold ring above the mold cavities and fluidly communicating with the mold cavities to receive liquid lead from the supply and serially deliver liquid lead to the mold cavities. In at least some applications of the method a belt may overlie some of the mold cavities while liquid lead is received therein to retain it therein and while it solidifies. In at least some applications of the method, the belt may move at the same tangential speed as the mold ring so that there is no relative movement between the belt and the mold cavity receiving liquid lead, or alternatively there may be relative movement between them to separate from the belt a solidified lead portion of the strip of serially-connected bipolar battery foils. In the case of the same tangential speed between the belt and mold ring, it has been found that friction is minimized or substantially lacking therebetween, and hence a lead antimony alloy with an antimony content of approximately 3 percent by weight—previously unavailable—can be employed as the material of the battery foil or grid. In at least some applications a solidified lead portion of the strip of serially-connected bipolar battery foils may be generally tangentially removed from the mold cavity and downstream thereof may be disengaged from the belt.

Figure 1:
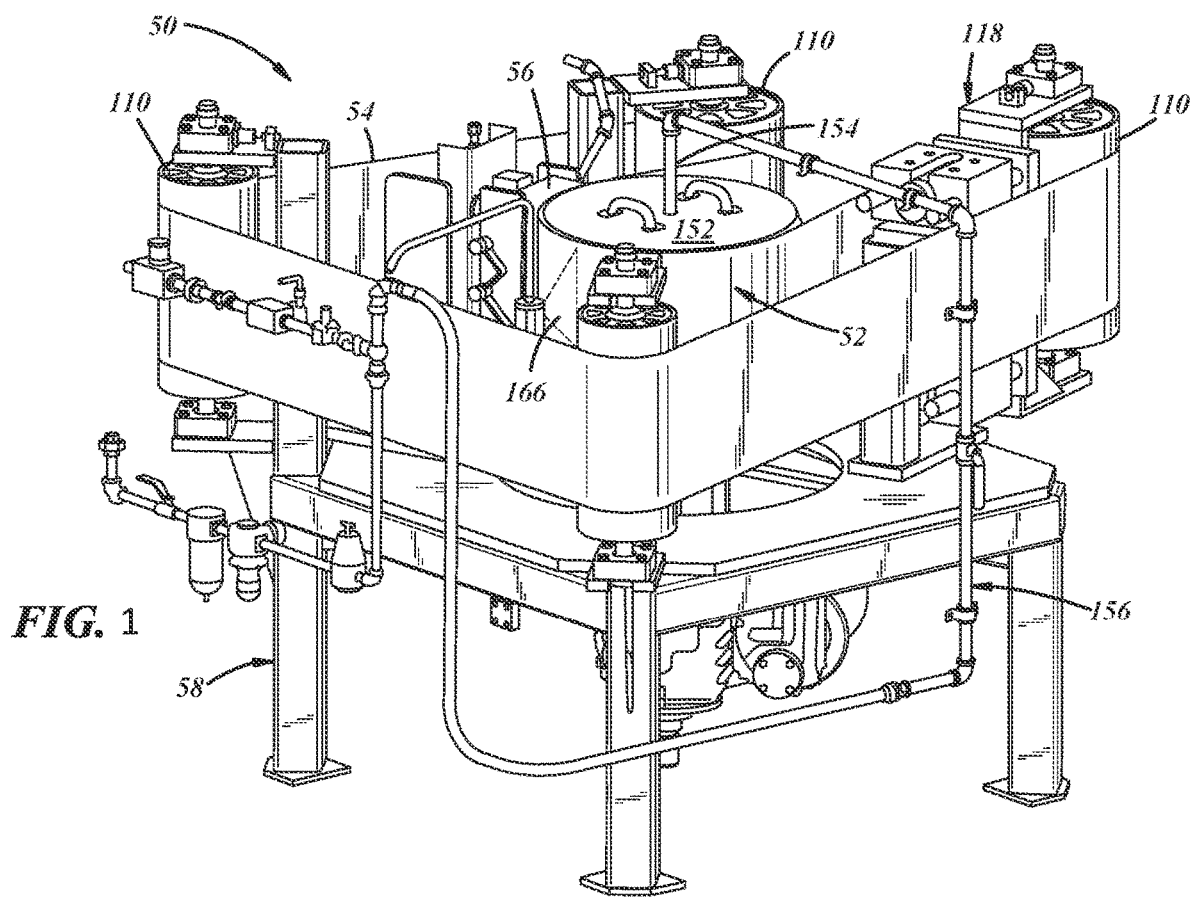
FIG. 1 is an isometric view of an embodiment of a machine that can be utilized to continuously cast a strip of a multitude of serially-connected bipolar battery foils that can be employed as current collectors in bipolar batteries after further processing, and/or for continuously casting battery grids of lead.
Figure 2:
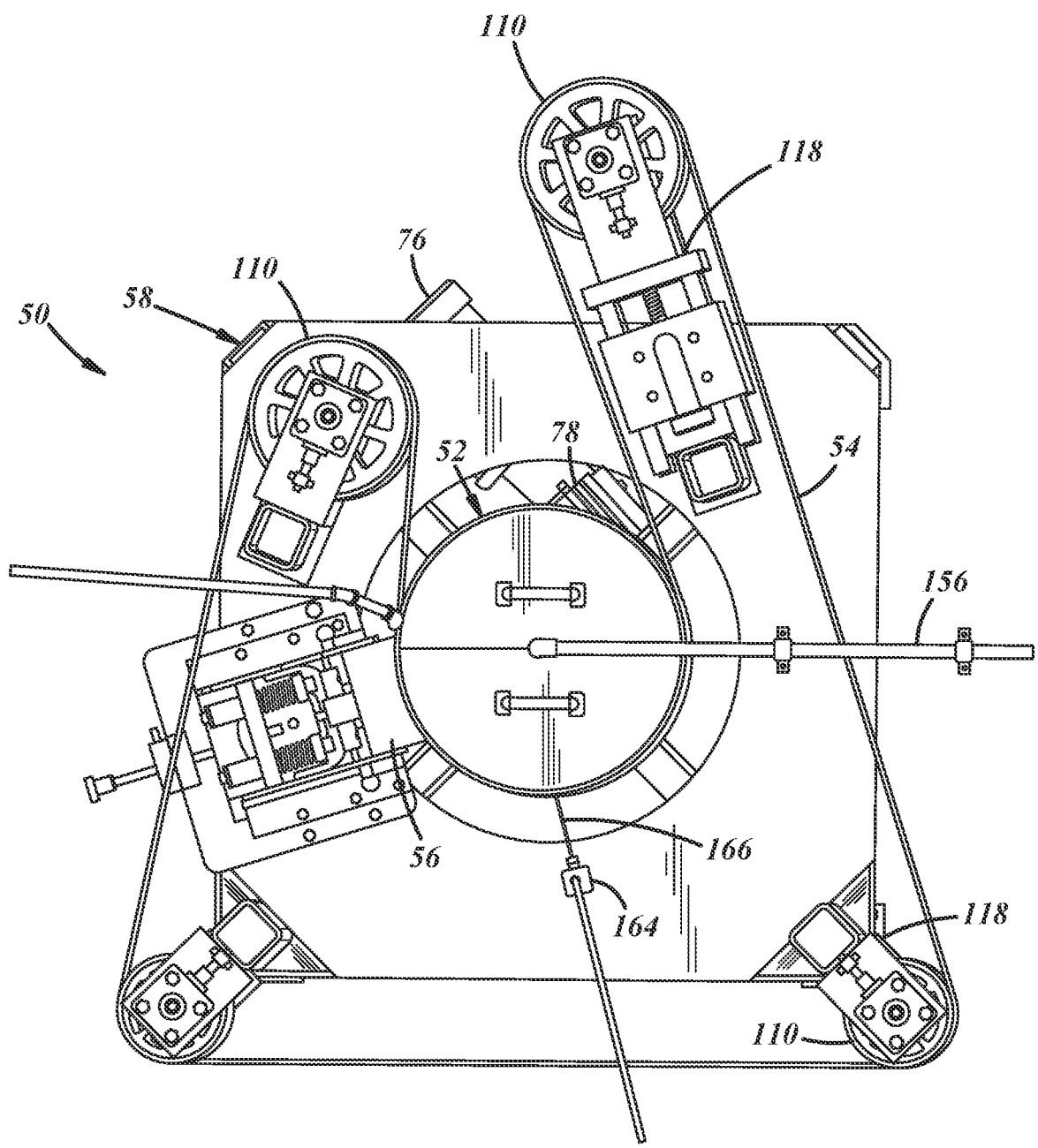
FIG. 2 is a top view with a shield removed of the machine of FIG. 1.

FIGS. 1-4 depict a machine 50 for continuously casting a lead strip of a multitude of serially-connected bipolar battery foils that can be employed as current collectors in bipolar batteries. Still, in certain embodiments, the machine 50 may be employed for continuously casting a lead strip with a plurality of serially-connected lead grids. As shown in FIGS. 1 and 2, the machine 50 may have a rotatable mold wheel or ring 52, a cooperating belt 54 spanning circumferentially around a portion of the mold ring 52, and at least one shoe 56 urging the belt 54 into engagement with the mold ring 52, and all carried by a frame 58. A tundish 60 may supply molten and liquid lead to the mold ring 52 as it rotates.

Figure 3:
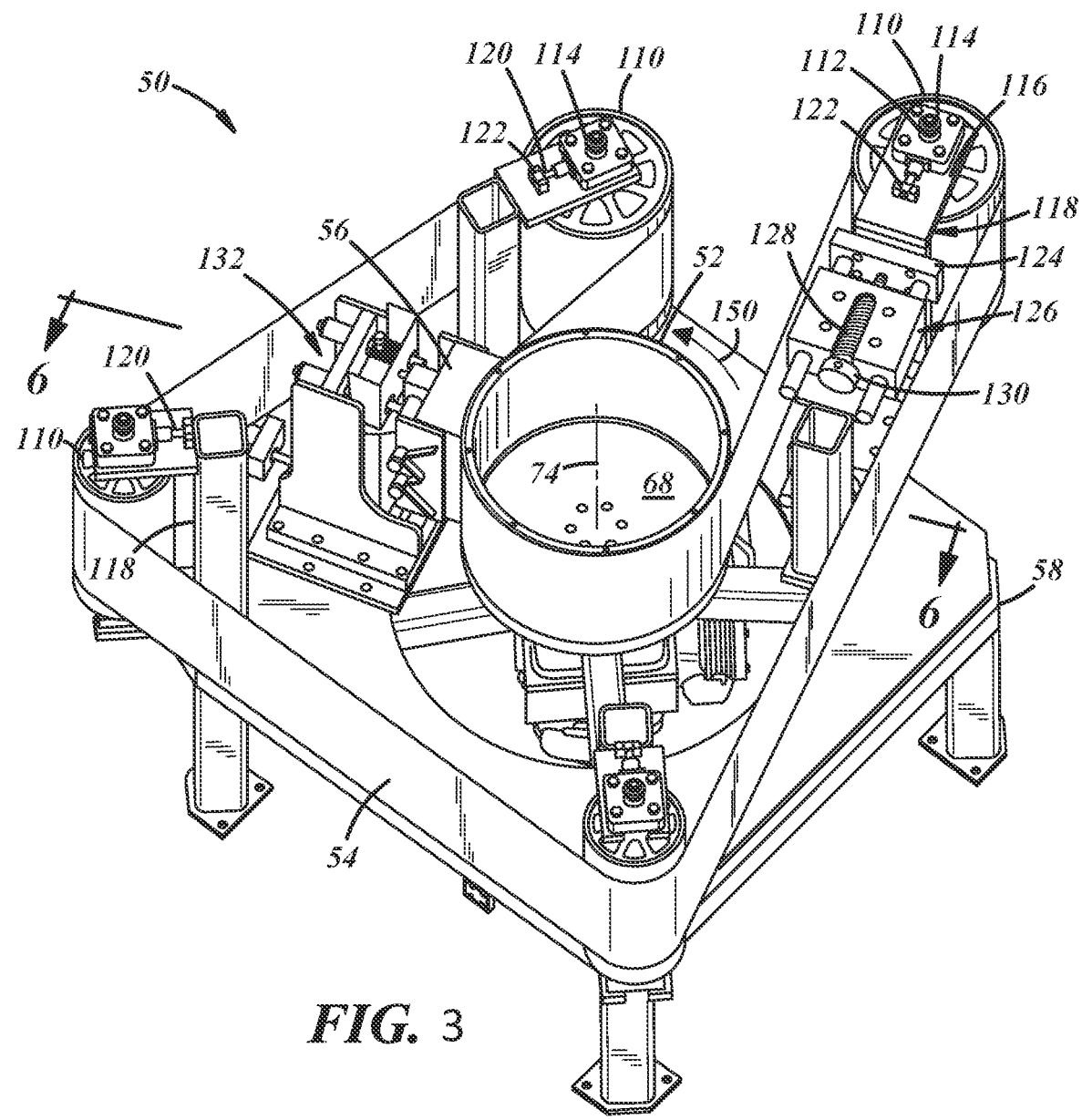
FIG. 3 is a perspective view of the machine of FIG. 1.
Figure 4:
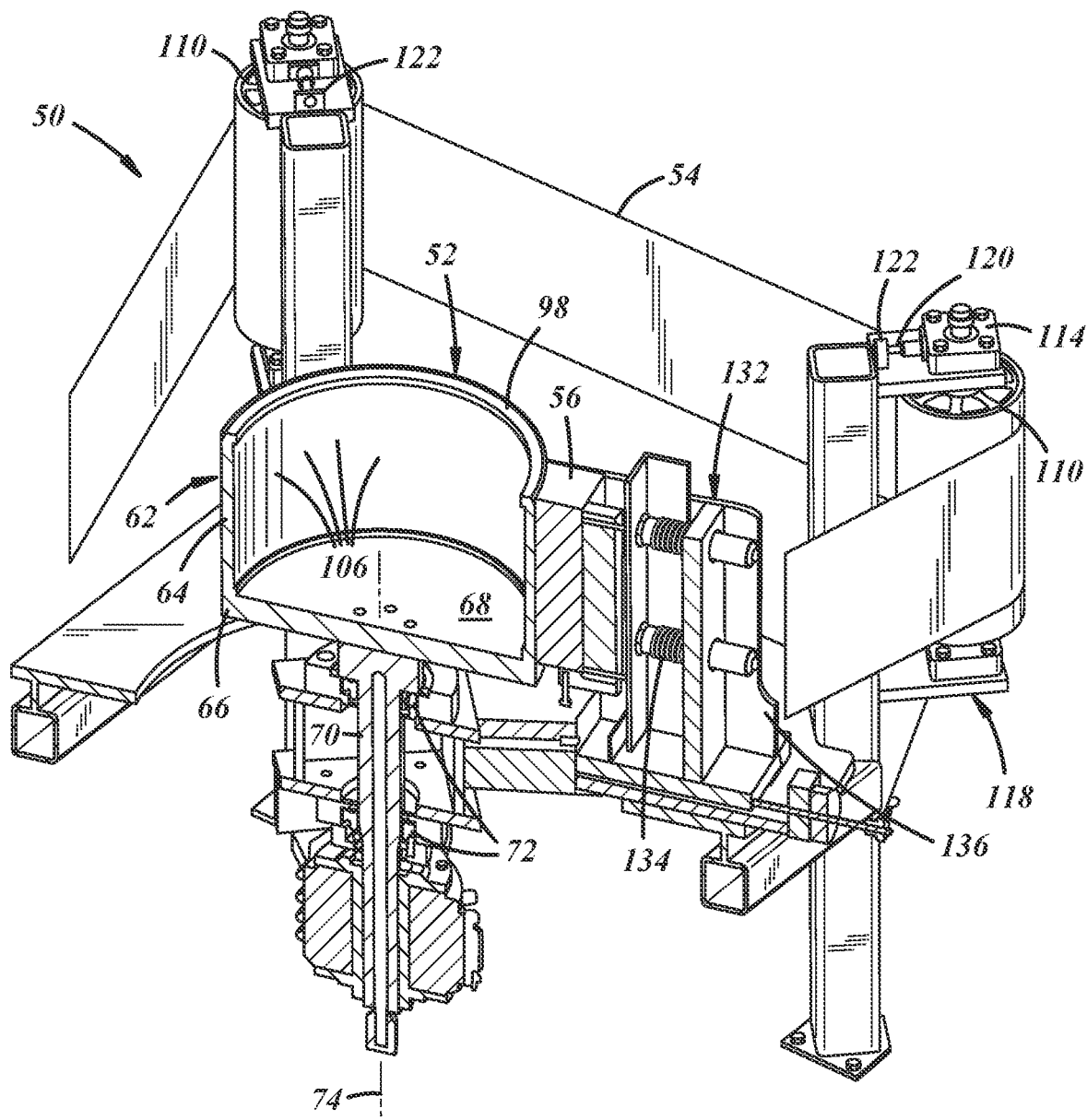
FIG. 4 is a sectional view taken generally on line 6-6 of FIG. 3.

As shown in FIGS. 3 and 4, the mold ring 52 may be a circumferentially continuous annular ring with a mold cavity 62 residing in its peripheral cylindrical outer surface 64. At its lower end 66, the mold ring 52 may be attached to a circular carrier plate 68 connected to a vertically extending shaft 70 journaled for rotation via bearings 72 carried by the frame 58. In operation, the shaft 70, and thus the mold ring 52, is rotated about a common vertical axis 74 by a variable speed electric motor 76 (FIG. 2) through a gearbox 78 operably connected to the shaft 70, according to this embodiment.

In the outer surface 64 of the mold ring 52, the mold cavity 62 may be machined or otherwise formed with a whole number of a plurality of a predetermined desired foil pattern or configuration.

Adjacent the top of the ring 52, it may have a runner system for the mold cavity 62. A circumferentially continuous groove 96 (FIG. 10) may be provided that extends around and opens into the top end 98 of the mold ring 52. As depicted, the groove 96 is slanted radially-inward, establishing an entrance for the supply of liquid lead to the mold cavity 62 that is tapered and narrowed axially-downward from the top end 98.

The thickness of the mold ring 52 can range typically from 0.25 to 3 inches; still, other thickness values are possible in other examples. It is preferable, per an embodiment, to keep the mold ring's effective thickness to less than 0.5 of an inch so that the temperature of at least part of the mold ring 52 remains manageable in terms of rapidly cooling and heating it. During the casting process it may be advantageous, per an embodiment, that at least part of the mold ring 52 be rapidly heated just prior to injection of the liquid lead being cast, and then the mold ring 52 be rapidly cooled once the liquid lead has vertically filled the mold cavity 62 leaving no void space. The more rapidly the mold ring temperature can be changed, the smaller the mold ring diameter needed to achieve production high run speeds. To reduce the effective thickness without sacrificing structural integrity, such as resistance to deflection, deformation, warping, cracking, etc., the mold ring 52 may have axially spaced apart circumferential grooves 102 (FIG. 10) in the inside diameter of the mold ring 52. The grooves 102 significantly reduce thermal mass, while maintaining a robust mold ring structure. The grooves 102 also allow for vortex-like flow when using heated liquid for temperature control of the mold ring 52.

Figure 10:
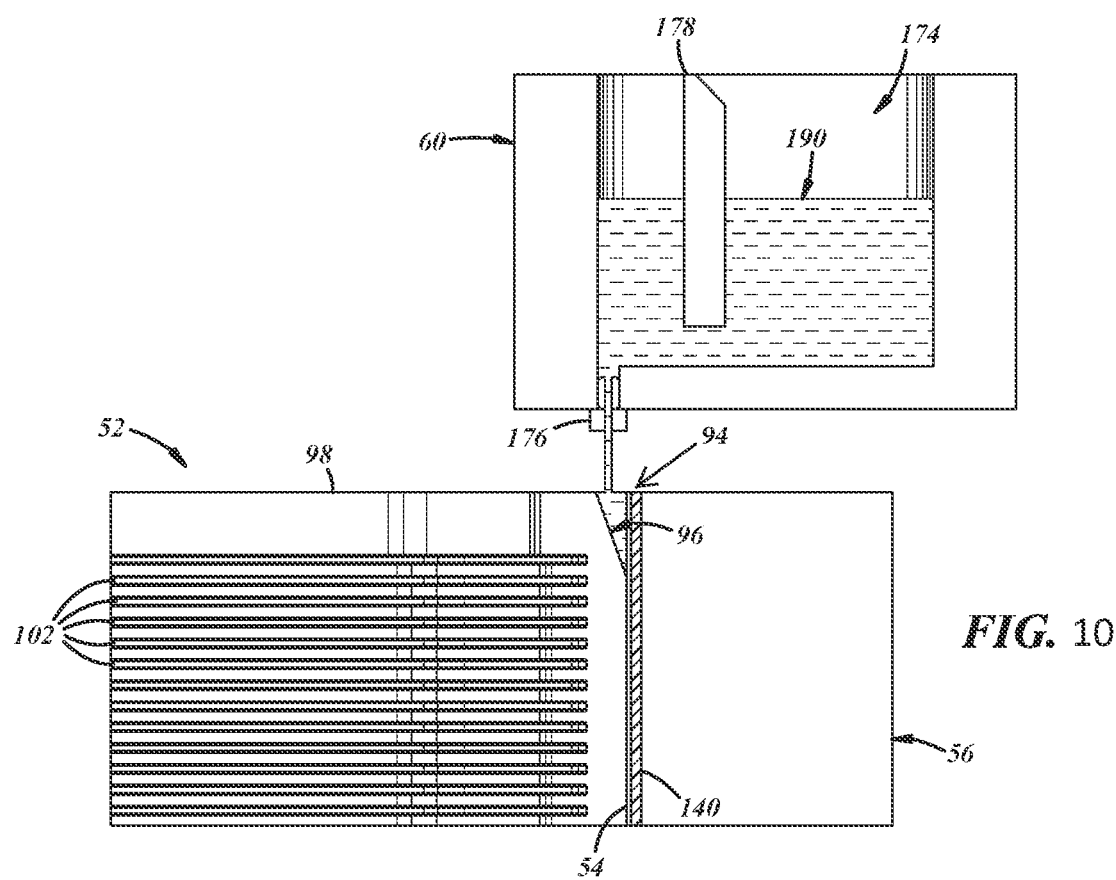
FIG. 10 is a somewhat schematic enlarged sectional view of the mold ring, belt, belt shoe, and tundish supplying liquid lead to the mold ring.

As shown in FIGS. 3 and 10, the belt 54 overlies the mold cavity 62 and runner system and bears on the mold ring 52 at least in the area in which liquid lead is dispensed into the mold cavity 62 and sufficiently downstream thereof for the liquid lead to solidify into a portion of the strip of a multitude of serially-connected bipolar battery foils. The belt 54 may have a transverse width greater than the axial extent of the runner system and mold cavity 62. The belt 54 is flexible, circumferentially continuous and preferably, per an embodiment, made of stainless steel.

As shown in FIGS. 1-4, the belt 54 is also received over guide rollers 110 each journaled for rotation with its axis extending generally vertically and essentially parallel to the axis 74 of rotation of the mold ring 52. Each roller 110 may have a shaft 112 rotatably received adjacent its ends in bearings 114 attached to the legs 116 of a generally U-shaped bracket 118 carried by the frame 58. To properly align the rollers 110 to maintain the desired path of travel of the belt 54 at least one of the bearings 114 for each roller 110 may be at least somewhat radially movable relative to its associated leg 116 of the bracket such as by a threaded shaft or cap screw 120 received in a complementary threaded support 122 fixed to its associated bracket 118. To adjust and maintain tension on the belt 54 at least one of the brackets 118 carrying one of the rollers 110 is mounted on a movable plate 124 of a slide mechanism 126 which may include a compression spring 128 yieldably biasing the plate 124 to provide a substantially constant biasing force tensioning the belt 54. The force produced by the spring 128 may be adjusted such as by a movable stop 130 bearing on the distal end of the spring 128. Belt tensioning can be provided in other ways, including with mechanisms of differing designs, constructions, and components than set forth herein. A suitable belt tensioning mechanism can be readily designed by skilled artisans and hence will not be described in further detail.

Figure 5:
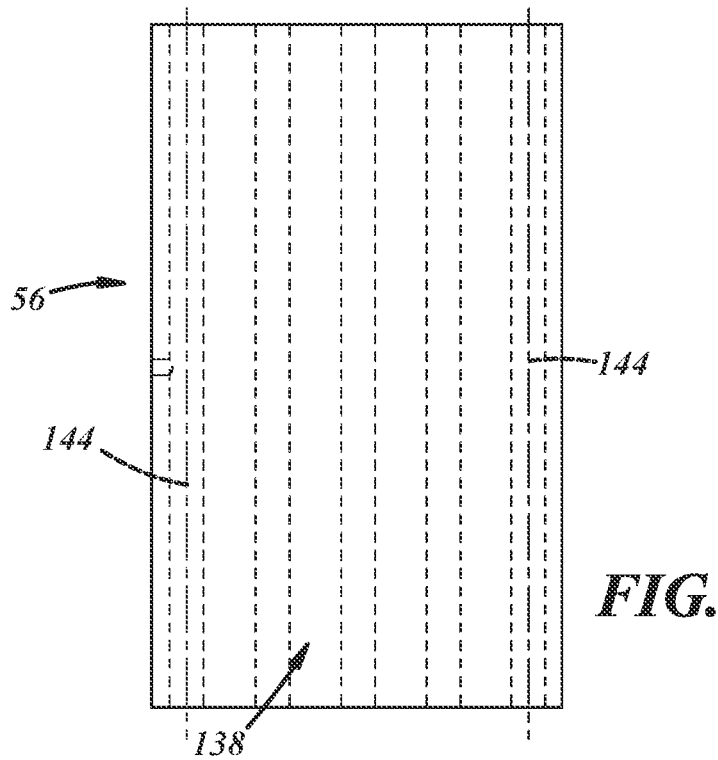
FIG. 5 is a somewhat schematic view of a belt shoe of the machine of FIG. 1.
Figure 6:
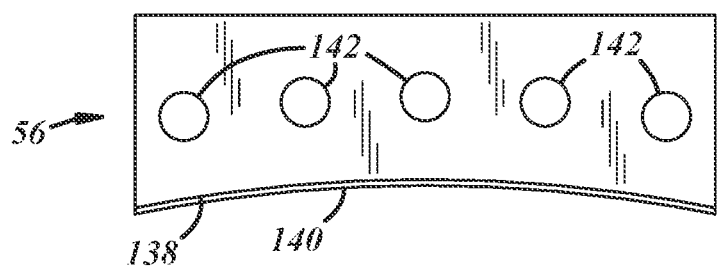
FIG. 6 is a top view of the belt shoe of FIG. 5.

To ensure that the belt 54 is firmly engaged with the mold ring 52 at least in the area of liquid lead entering the mold cavity 62 and solidifying therein, the shoe 56 may urge the belt 54 into sealing engagement with the peripheral cylindrical surface 64 of the mold ring 52. The shoe 56 may be attached to a slide mechanism 132 which may include one or more springs 134 yieldably biasing the shoe 56 toward the belt 54 and mold ring 52. The slide mechanism 132 may be attached to a bracket 136 carried by the frame 58. The slide mechanism could have differing designs, constructions, and components in other embodiments. As shown in FIGS. 5 and 6, the shoe 56 may have an arcuate front face 138 which desirably, per an embodiment, has a sheet of graphite material 140 attached thereto so that in assembly the graphite sheet bears on a confronting portion of the belt 54 to thereby reduce the friction between the belt 54 as it moves and the shoe 56 during operation of the casting machine 50.

The shoe 56 may have through passages 142 with electric heating elements 144 received therein for the purpose of heating a portion of the belt 54 somewhat upstream of and/or in the area where liquid lead enters the mold cavity 62 to ensure that liquid lead fills the full vertical or axial extent of and desirably a downstream portion of the mold cavity 62 before the lead in the mold cavity 62 solidifies as it moves downstream with the mold cavity 62 during operation of the casting machine 50. The graphite sheet 140 may have a thickness in the range of approximately 0.03 to 0.25 of an inch and the shoe 56 may be made of a thermally conductive metal such as steel, brass, or copper. Alternatively, for some applications, the entire shoe 56 may be made of a graphite material which would include as a homogeneously integral part thereof the graphite sheet. The graphite sheet or graphite shoe may also compensate for any minor variations that would otherwise cause the belt 54 to have a poor fitment with the mold ring 52. This poor fitment may cause the belt 54 to lose contact with the rotating mold ring 52 in the area of liquid lead in the cavity 62 which may produce undesirable lead flashing on portions of the cast strip. Such poor fitment may occur from belt 54 to rotary mold ring 52 misalignment with respect to each other, asymmetric rotation of the mold ring 52, drive shaft 70 flexing, inadequate belt tension, acute belt stretching at the point of lead introduction and entry into the mold cavity 62, among other things. Therefore, a carbon material interface with the belt 54 may ensure acceptable engagement of the belt 54 with the rotating mold ring 52 until the liquid lead has sufficiently cooled or solidified to where its cast structure is self-supporting.

Figure 7:
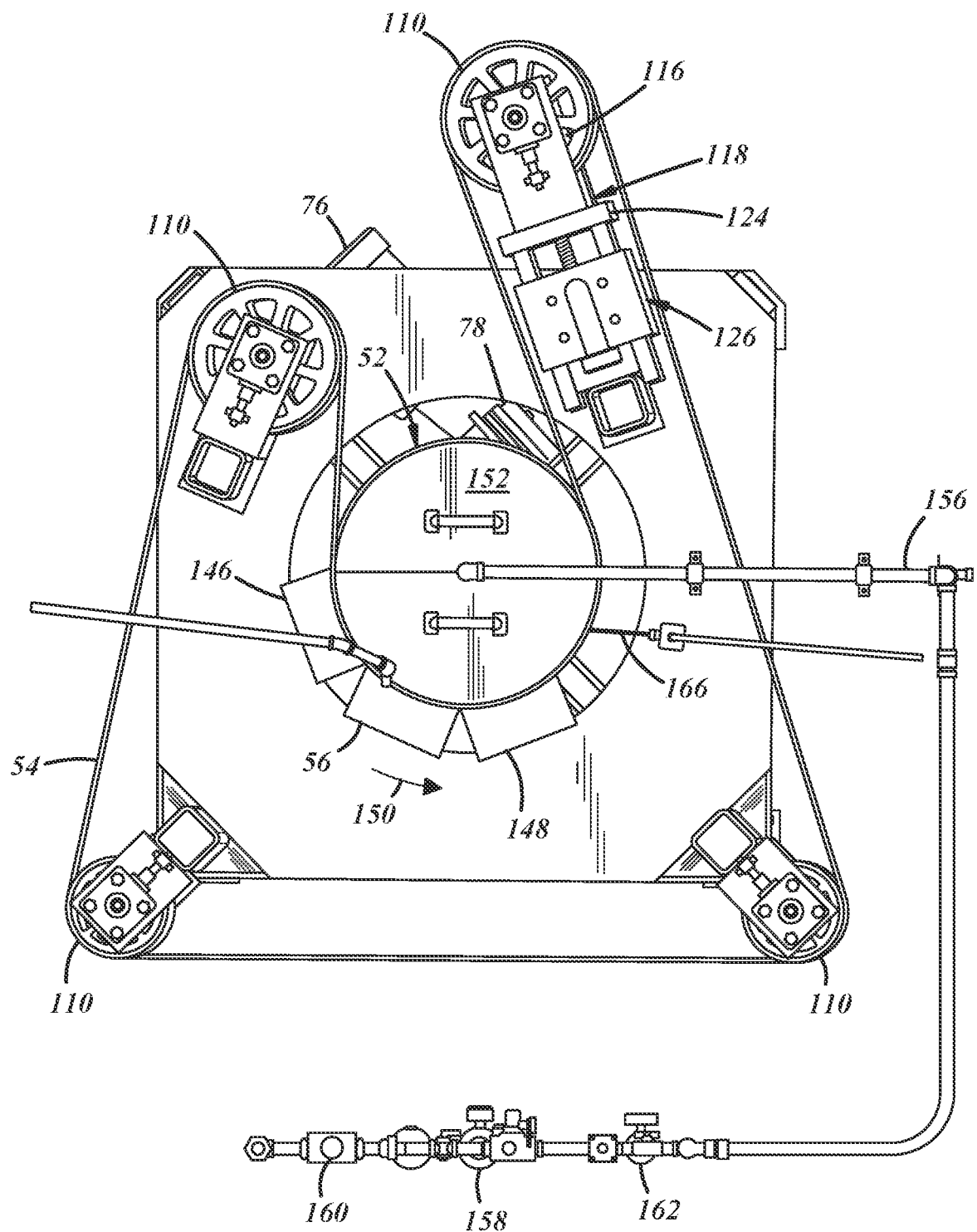
FIG. 7 is a plan view of a modification of the machine of FIG. 1 with three belt shoes.

As shown in FIG. 7, in some applications, it may also be desirable to provide a cooling shoe 146 upstream and/or a cooling shoe 148 downstream of the heating shoe 56 relative to the direction of rotation 150 of the mold ring 52. Such an upstream cooling shoe 146 may be used to provide a barrier inhibiting or preventing the backflow of excess liquid lead upstream of the heated shoe 56. This upstream shoe 146 will rapidly solidify any liquid lead moving significantly upstream of the point at which it enters the mold cavity 62. This cooling shoe may not necessarily require a means of active cooling if it dissipates sufficient heat to the ambient atmosphere to maintain a temperature at least 100° F. lower than the temperature of the hot shoe 56. If this ambient cooling is insufficient to prevent excessive liquid lead backflow this upstream shoe 146 may be actively cooled such as by a liquid coolant or cooled air circulation through the shoe 56.

The cooling shoe 148 located downstream of the hot shoe (in terms of the direction 150 of mold ring rotation shown in FIG. 7) may initiate relatively rapid cooling of liquid lead in the mold cavity 62. This downstream cooling may prompt rapid solidification of the liquid lead in the mold to ensure that full vertical filling of the mold cavity 62 with liquid lead occurs in the hot zone rather than liquid lead run around (in the circumferential direction of rotation of the mold ring in FIG. 7) in the mold cavity 62 which would result in incomplete filling of the mold cavity 62, and thus avoids defects in portions of the continuous cast lead strip. It is desirable that the cast portion of the strip be fully rigid before it exits the cooling zone which may be provided by this downstream shoe 148 to also prevent any lead flashing downstream of the hot zone casting area. This shoe 148 may not require active cooling if its temperature remains sufficiently lower than that of the hot shoe 56, preferably at least 100° F. lower, but if necessary, it may be actively cooled by circulation of liquid coolant through passages in this shoe 148 or cold air circulation through or over the shoe 148. In some applications, it may be feasible to use a single shoe of sufficient circumferential extent so that it may include both heating and cooling zones.

In operation, per an embodiment, it is usually necessary to also heat at least the liquid lead pouring or casting area of the mold ring 52 to a temperature which usually may be in the range of about 150-550° F. depending upon, among other things, the thickness of the cast strip usually with lower temperatures for thicker strips. In operation the mold ring 52 may be heated by an electric infrared heater, hot air heater, a gas burner received in the central area inside of the mold ring 52 or a heated liquid circulated through the interior of the mold ring 52 with a sealed cover to provide a closed chamber through which the heated liquid is circulated. The higher the mold ring temperature employed, the lower the maximum operating output speed of continuously cast strip. In operation, to decrease the temperature to which the mold ring 52 must be heated, it may be desirable to apply conventional mold cork to the mold cavity surface of the mold ring 52 to increase the time required for solidification of the liquid lead to ensure it completely fills the vertical or axial extent of the mold cavity before it solidifies. The mold cork may also avoid sticking in the mold cavity of the newly cast and solidified portion of a longitudinal strip. The mold cork may be of a composition well-known to ordinarily skilled artisans and may be sprayed onto the surface of the mold cavity.

As shown in FIGS. 1 and 2, a combustible gas such as natural gas may be supplied to burners received within the mold ring 52 and below a cover 152 adjacent the upper end 98 of the mold ring 52. The portion 154 of a gas supply line 156 extending into the mold ring 52 may be coaxial with the axis 74 of rotation of the mold ring 52, and the cover 152 may be either carried by and rotate with the mold ring 52 or be supported independently of the mold ring 52 with its periphery spaced slightly from the mold ring 52. Desirably, per an embodiment, the cover 152 may also be insulated or made of an insulative material to decrease heat transfer through the cover 152 to the exterior atmosphere. A pressurized combustible gas (such as natural gas) may be supplied to the pipe line 156 through a suitable pressure regulator 158 (FIG. 7) and shut off valve 160 and desirably, per an embodiment, a flow rate control valve 162 to maintain the desired temperature of the mold ring cavity 62 during operation of the casting machine.

In some applications, it may be desirable to provide active cooling of the belt 54 downstream of the shoe or shoes (relative to the direction of rotation of the mold ring) which cooling may be particularly desirable when casting battery lead alloys which have a relatively large or wide window of solidification temperatures (such as lead antimony alloys) to ensure that the newly cast portion of the continuous strip may be removed from the mold cavity without damage to the strip structure. Such active cooling may be provided as shown in FIG. 2 by a nozzle 164 spraying a liquid coolant 166 such as water onto a surface of the belt 54 downstream of the shoe or shoes (relative to direction of rotation of the mold ring). This active cooling of the belt 54 may also prevent or avoid sticking of the newly cast portion of the elongate strip to the side of the belt 54 facing the mold ring. This is believed to provide rapid or shock cooling of the belt 54 which produces rapid shrinking of the cast material on the belt 54 and the belt itself, thereby dislodging or separating solidified cast lead from the surface of the belt 54. An alternative approach to avoid sticking of newly solidified portions of the cast strip to the surface of the belt 54, may be to provide a very slight slip or movement between the belt 54 and the mold ring 52 to essentially shear or separate the solidified lead from the surface of the belt 54 while the solidified portion of the newly cast strip remains in the mold cavity 62 of the mold ring 52.

Figure 8:
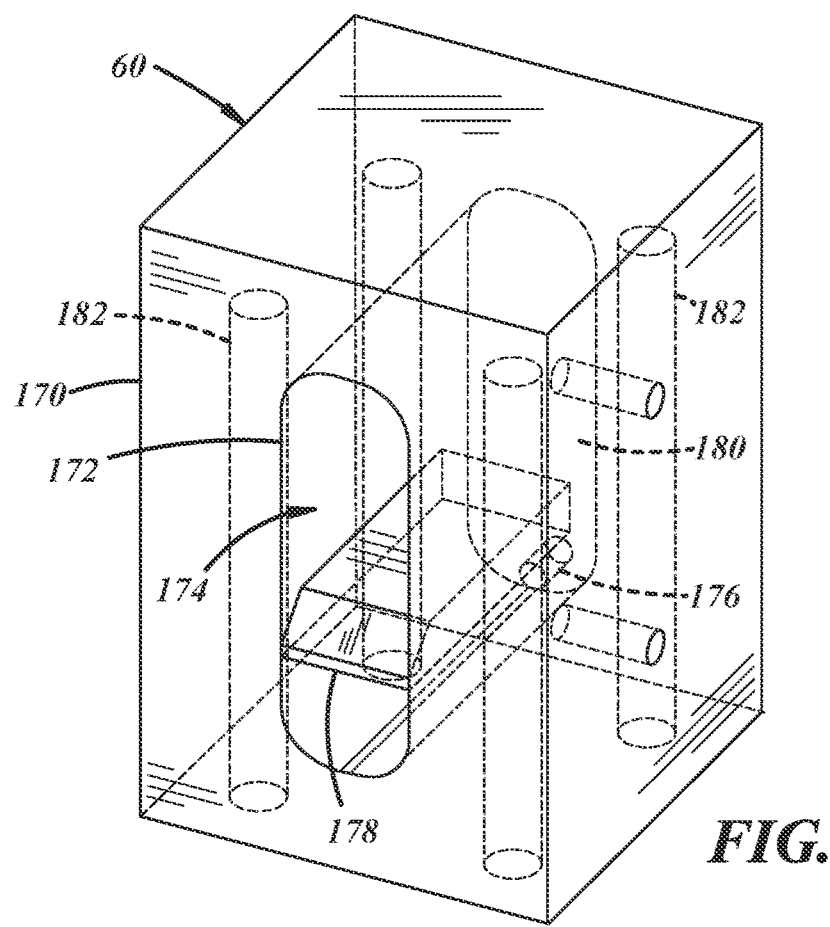
FIG. 8 is an isometric view of a tundish for delivering liquid lead to a mold ring of the machine of FIG. 7.
Figure 9:
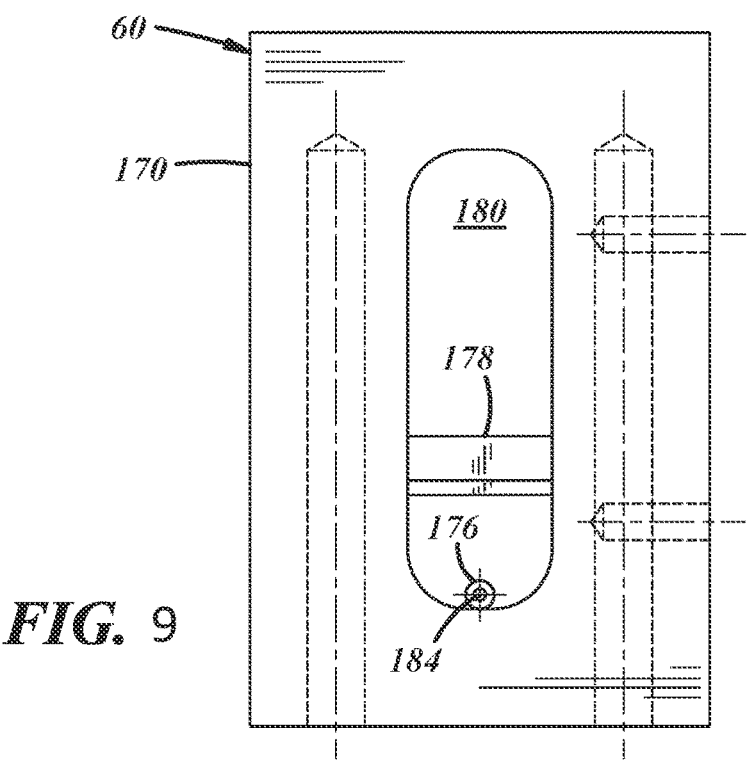
FIG. 9 is a top view of the tundish of FIG. 7.

As shown in FIG. 10, in operation of the casting machine 50, liquid lead may be supplied through the tundish 60 to the runner system 94 of the rotating mold ring 52 in the area of or slightly downstream of the heated shoe 56. As shown in FIG. 10, the tundish 60 may be disposed generally vertically or axially above the runner system. As shown in FIGS. 8 and 9, the tundish 60 may be in the form of a thermally conductive body 170 with a blind recess 172 therein providing a container 174 for receiving liquid lead and a nozzle 176 through which liquid lead may flow to the runner system 94 of the mold ring 52. To minimize, and desirably eliminate, turbulent flow of liquid lead to the nozzle 176 and to minimize, and desirably essentially eliminate, dross from passing through the nozzle, a weir 178 is provided in the container 174 in engagement with its side wall and extending from adjacent its top downwardly toward and terminating above the bottom 180 of the container 174. To maintain liquid lead in the tundish 60 at a desired predetermined temperature, electric heating elements may be received in bores 182 in the body 170 which are spaced outboard of the container recess 172 in the body. The size of a passage or orifice 184 through the nozzle may be selected to provide the desired rate of flow of liquid lead into the runner system 94 of the mold ring 52 when the casting machine is in operation. A suitable tundish 60 or other device for supplying liquid lead at a desired flow rate to the runner system 94 of the mold ring 52 may be readily designed and constructed by persons of skill in the art and thus will not be further described herein.

As shown in FIG. 10, in operation of the casting machine 50, liquid lead 190 may flow through the nozzle 176 and into the runner system 94 of the mold ring 52 by gravity with liquid lead being supplied to the tundish 60 either intermittently or substantially continuously to maintain a desired head and a substantially constant flow rate of liquid lead into the runner system 94. The desired flow rate of liquid lead 190 from the tundish 60 and into the runner system 94 and mold cavity 62 will be dependent upon a number of factors, including without limitation, the size and configuration of the strip being cast, the size and configuration of the runner system 94, the temperature, composition and fluidity of the liquid lead supplied from the tundish 60, the mold configuration and ring material, the belt 54 thickness and material, the configuration and material of the shoe or shoes, etc. In operation of the casting machine 50, liquid lead or a lead alloy may be supplied to the runner system 94 of the rotating mold ring 52 at a temperature which is usually at least 680° F. and desirably in the range of 100 to 200° F. greater than the melting temperature of the lead or lead alloy and while in the lead pouring or casting zone the mold ring 52 is usually maintained at a temperature in the range of 200 to 300° F. lower than the melting temperature of the liquid lead, the hot shoe 56 temperature is maintained in this casting zone in the range of about the same as to 150° F. higher than the liquid lead melting temperature, and in the immediate downstream cast lead solidification zone the mold ring temperature and any cooling shoe temperature is maintained at least about 100° F. and desirably in the range of about 200 to 300° F. below the melting temperature of the liquid lead. These temperatures are dependent upon the design, size, thickness, and weight of the continuous cast strip, the rate at which the strip is being continuously cast (lineal feet per minute), composition of the lead alloy, etc. In general, the thinner the strip being cast, the greater or higher the rate at which the strip is being cast, and the greater the alloy content of the lead alloy, the higher the temperature of the liquid lead will need to be when supplied to the runner system of the mold ring to successfully cast a solid strip of serially-connected foils.

Figure 11:
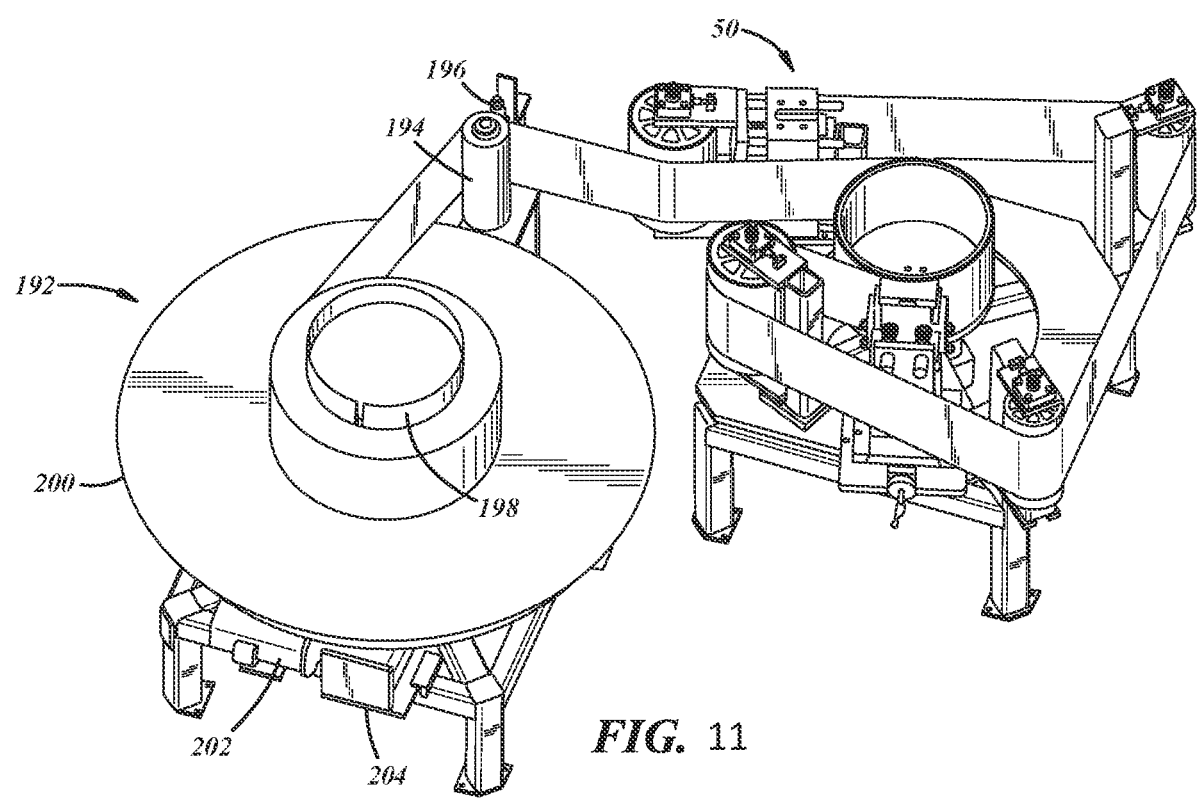
FIG. 11 is an isometric view of an embodiment of a coiler machine winding into a roll a continuous cast strip of serially-connected bipolar battery foils or battery grids produced by the machine of FIG. 1.

As shown schematically in FIG. 11, in operation of machine 50, the continuous cast and solidified portion of the lead strip and the belt 54 may separate from the rotating drum 52 downstream of the solidification zone, and downstream thereof the cast strip may be separated from the belt 54 and be wound into a coil or roll by a coiling machine 192. The coiling machine 192 may include guide rollers 194, 196, and a hub 198 and roll supporting disk 200 which in operation may be rotated by a variable speed electric motor 202 through a suitable gearbox or transmission 204. A suitable electronic controller may vary the speed of rotation of the hub and disk to take up and coil into a roll the cast strip 20 at the speed at which it emerges from the casting machine 50. A coil of continuous cast strip may be removed from the coiling machine 192 and subsequently unwound for further processing such as severing of the continuous cast strip into individual foils.

Figure 12:
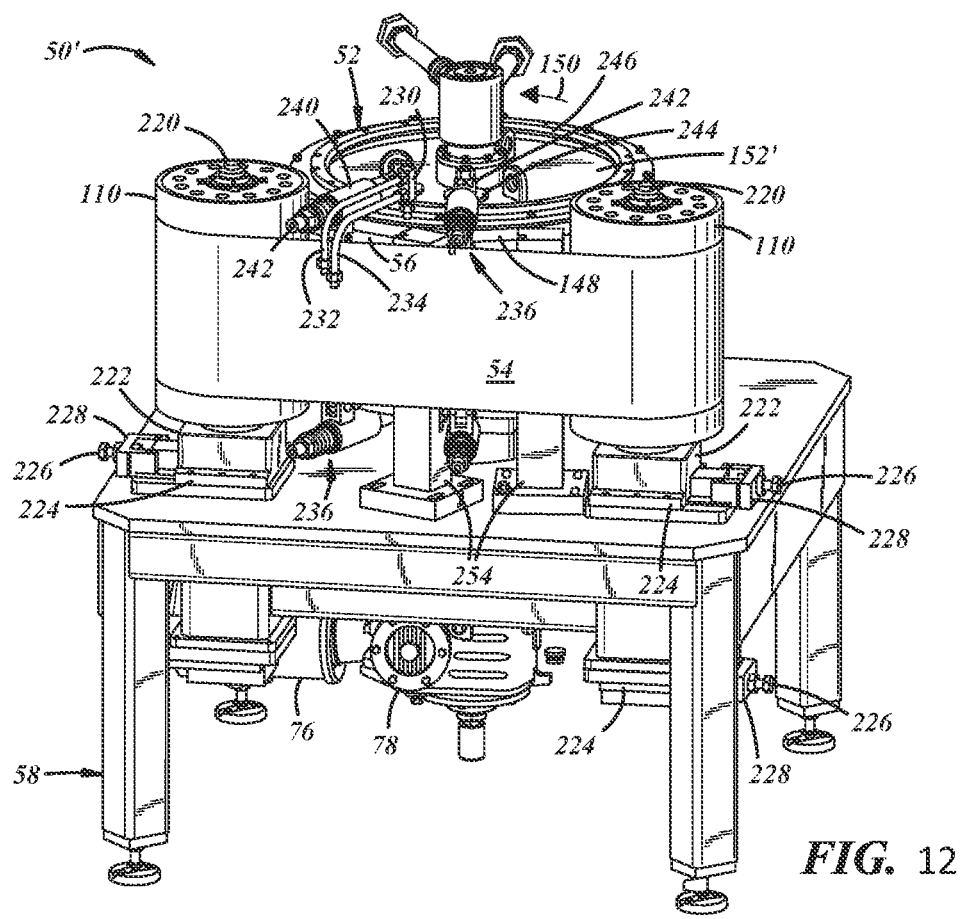
FIG. 12 is an isometric view of another embodiment of a machine for continuous casting a strip of a multitude of serially-connected bipolar battery foils and/or battery grids.
Figure 13:
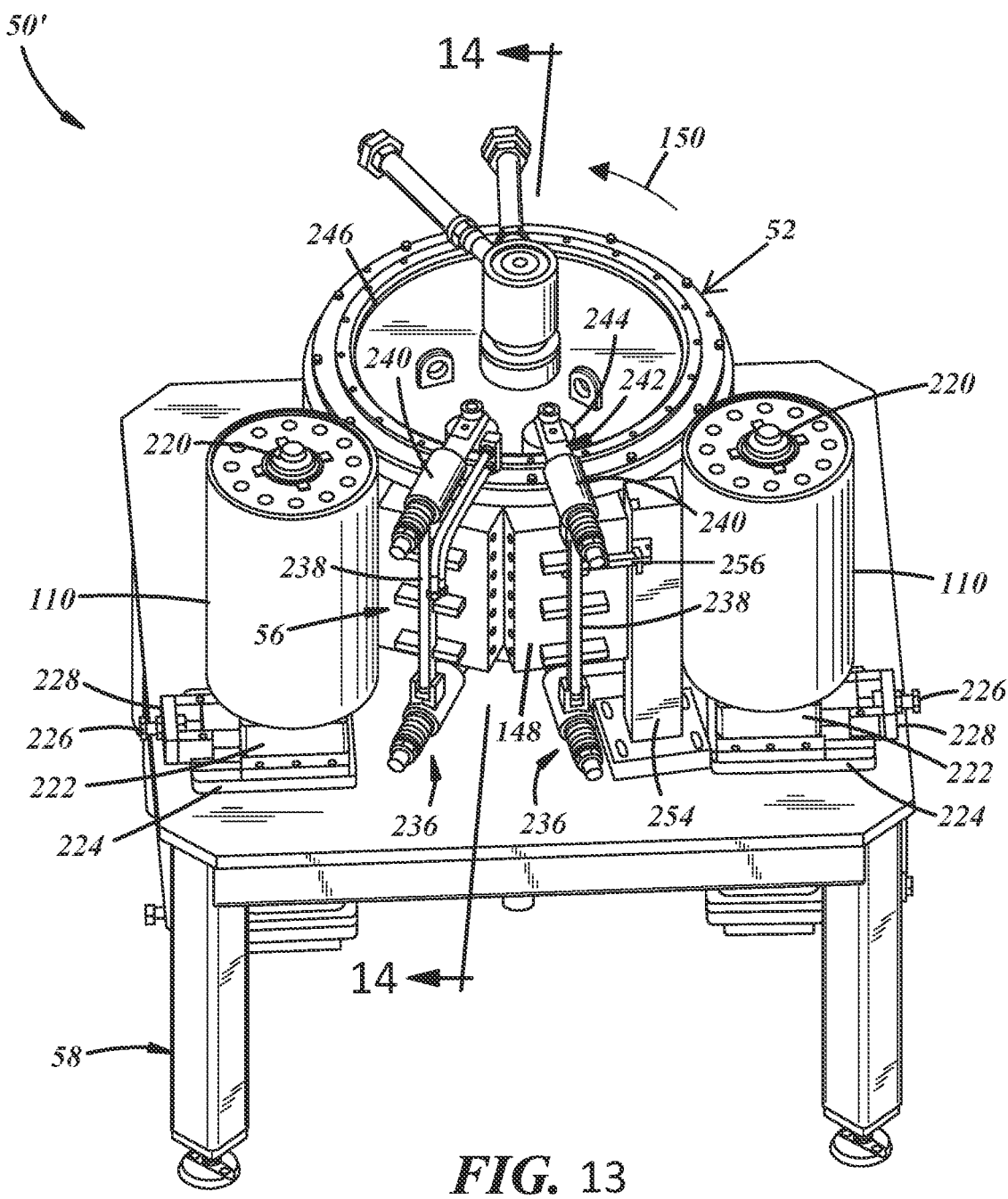
FIG. 13 is an isometric view of the machine of FIG. 12 with its belt removed.
Figure 14:
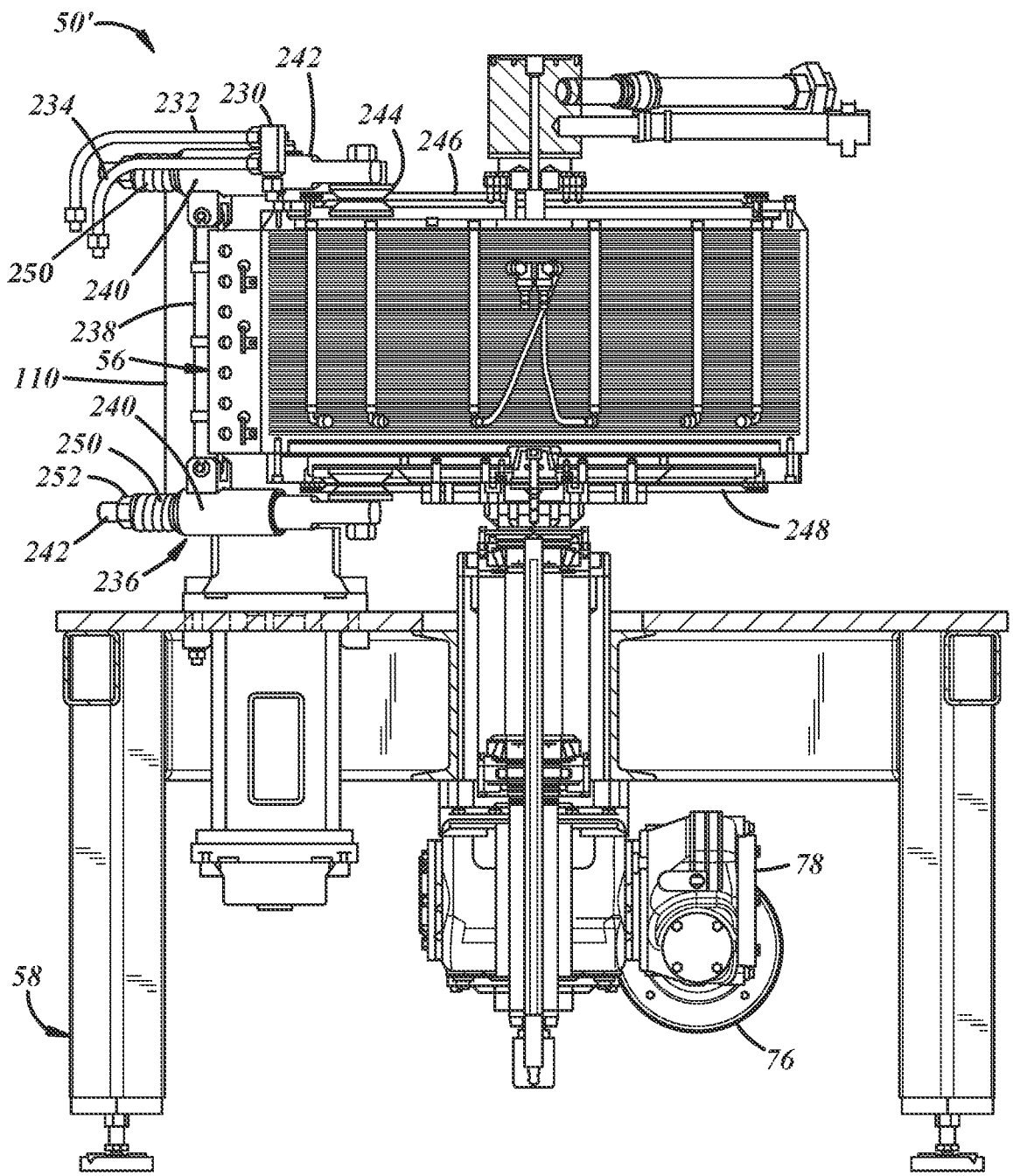
FIG. 14 is a sectional view taken generally on line 14-14 of FIG. 13.

FIGS. 12-14 illustrate a continuous casting machine 50' in which components and parts which are essentially the same as those of casting machine 50 are identified with the same reference numbers and parts and components having substantially the same function as those of machine 50 are identified with the same reference numbers having a prime (').

As shown in FIGS. 12 and 13, the casting machine 50' may have a belt 54 carried by rollers 110 each journaled for rotation on a shaft 220 mounted on a carriage 222 received on ways 224 attached to a base plate of the frame 58. To adjust the tension on the belt 54 to guide and urge it into engagement with the mold ring 52, a bolt or cap screw 226 is rotatively connected to the carriage and threaded through a bar 228 attached to the base plate.

Liquid lead may be supplied to the runner system 94 of the mold ring 52 through a nozzle 230 desirably with a restricted orifice. Excess liquid lead from a source such as a furnace or a holding pot may be supplied to the nozzle 230 through a feed line 232 and the portion not discharged from the nozzle 230 may be returned through a return line 234 to the furnace or holding pot. Desirably, per an embodiment, the excess liquid lead is supplied to the nozzle at a super atmospheric pressure such as by a pump driven by a variable speed motor to control the flow rate at which liquid lead is discharged from the nozzle and supplied to the runner system 94.

In some applications it may be desirable to have a heated shoe 56 upstream of and perhaps overlapping the outlet area of the nozzle 230, and a cooling shoe 148 downstream of the nozzle 230 relative to the direction of rotation 150 of the mold ring 52. The heated shoe 56 may promote complete filling with liquid lead of the complete vertical extent of the portion of the mold cavity 62 passing under the nozzle 230 and the cooling shoe 148 may promote rapid solidification of the liquid lead in the mold cavity downstream of the nozzle.

As best shown in FIGS. 13 and 14, each shoe 56, 148 may be carried by a separate mounting assembly 236 to urge the belt 54 into firm engagement with the mold ring 52 desirably without putting any significant radial force on the shaft 70 and bearings 72 of the mold ring drive assembly. Each mounting assembly 236 may have a shoe carrier bar 238 pivotally connected adjacent each end to a separate sleeve 240 slidably received on a shaft 242 with a follower grooved wheel 244 journaled for rotation adjacent one end of the shaft and engageable with a complementary generally V-shaped and circumferentially continuous portion of an associated upper or lower track ring 246 or 248 attached to the mold ring 52 for rotation therewith. Each follower wheel 244 is urged into engagement with its associated track ring by a compression spring 250 received over its associated shaft 242 and received and axially compressed between its associated sleeve 240 and a nut 252 engaging a complementary threaded portion of the shaft. To change and adjust the force produced by each spring 250, its associated nut 252 may be rotated on the shaft to change the extent to which the spring 250 is compressed. This changes and adjusts the force urging the shoe 56, 148 into engagement with the belt 54 and the belt 54 into engagement with the mold ring 52. As the mold ring 52 and belt 54 rotate generally circumferential movement of each shoe is resisted by an associated carrier post 254 to which the shoe may be connected by a link 256 pivotally connected adjacent one end to the shoe and adjacent the other end to its associated post.

The machine 50' functions and operates in substantially the same way as the machine 50 and thus a description of its functions and operation to cast a continuous strip of a plurality of serially-connected bipolar battery foils will not be repeated. In operation of the machine 50', its belt 54 may be guided by its downstream roller 110 to separate and remove from the mold cavity 62 a solidified portion of the continuous strip and separate the continuous strip from the belt 54 in substantially the same way as that shown in FIG. 11 for the machine 50.

The machines 50, 50' have been shown to produce strips exhibiting a desirable relatively small grain size, relatively uniform grain size, and a crystal morphology throughout the strip/foil structure. Without intending to be limited to a particular theory of causation, it is currently thought that the enhanced grain is due in part or more to the gravity-fed liquid lead capabilities of the machines.

Relatively thin stainless-steel belts 54 with a thickness in the range of 0.01 to 0.02 of an inch may be desirable as they allow for rapid heat transfer from the shoe 56 to the belt casting surface and from the belt 54 to the cooling shoe 146 and/or cooling shoe 148. However, thicker belts can be used.

In operation of the casting machines 50 and 50', a continuous strip of a plurality of serially-connected bipolar battery foils of a lead or lead alloy may be cast and produced at a rate typically in the range of about 20 to 80 lineal feet per minute, as but one example; still, other rates are possible in other examples.

Figure 15:
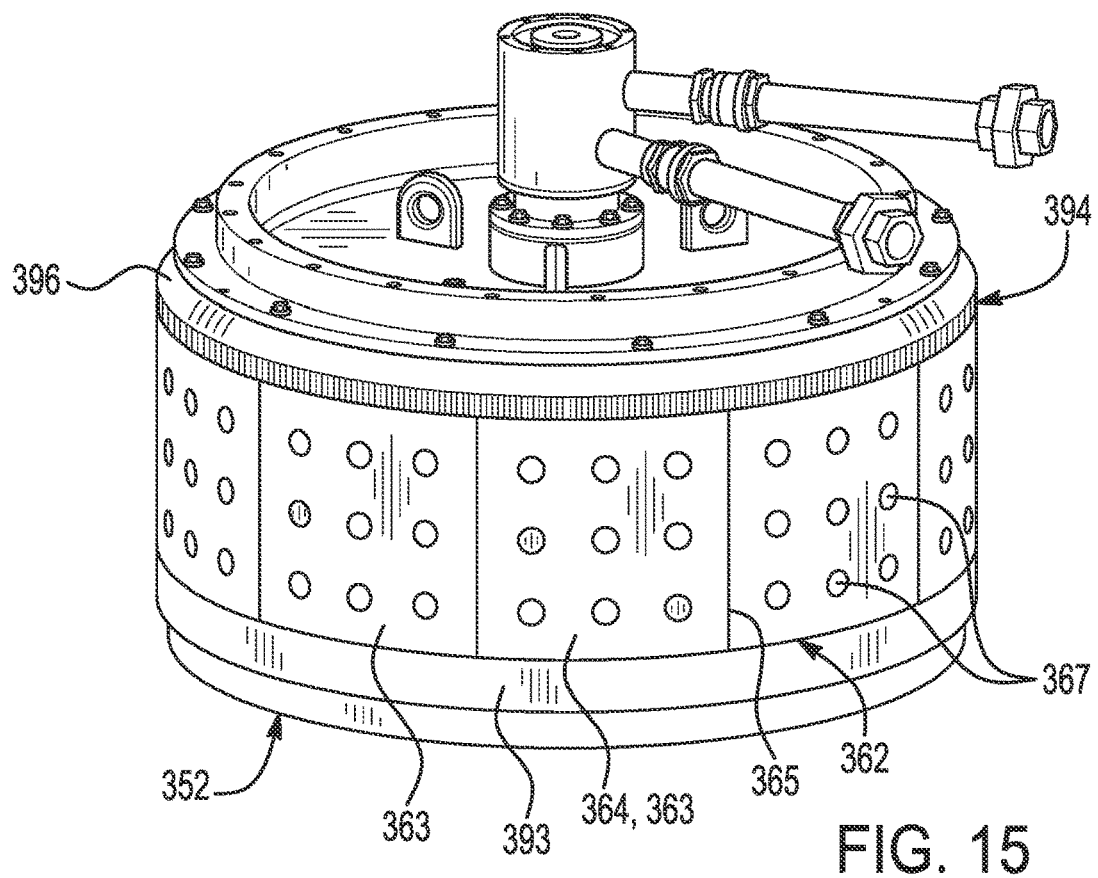
FIG. 15 is a perspective view of an embodiment of a mold ring that can be utilized to continuously cast a strip of a multitude of serially-connected bipolar battery foils.
Figure 16:
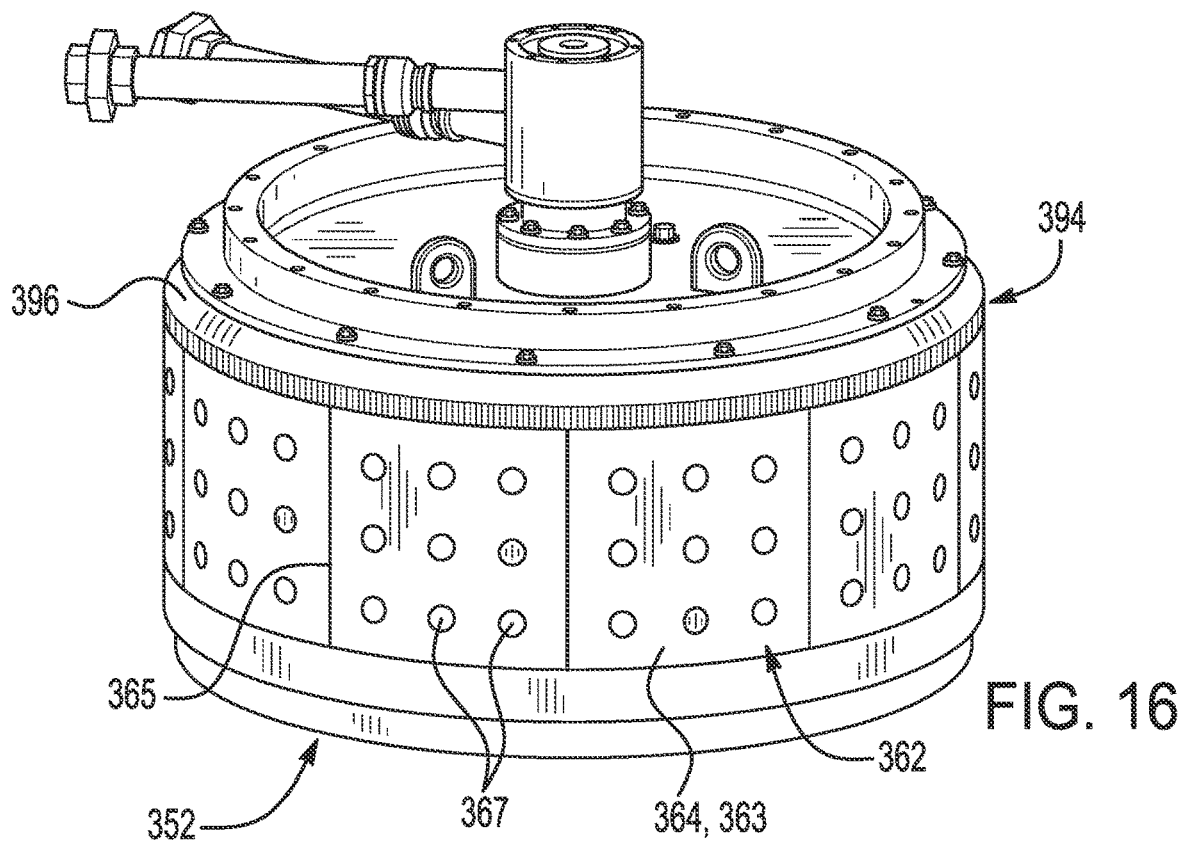
FIG. 16 is another perspective view of the mold ring of FIG. 15.
Figure 17:
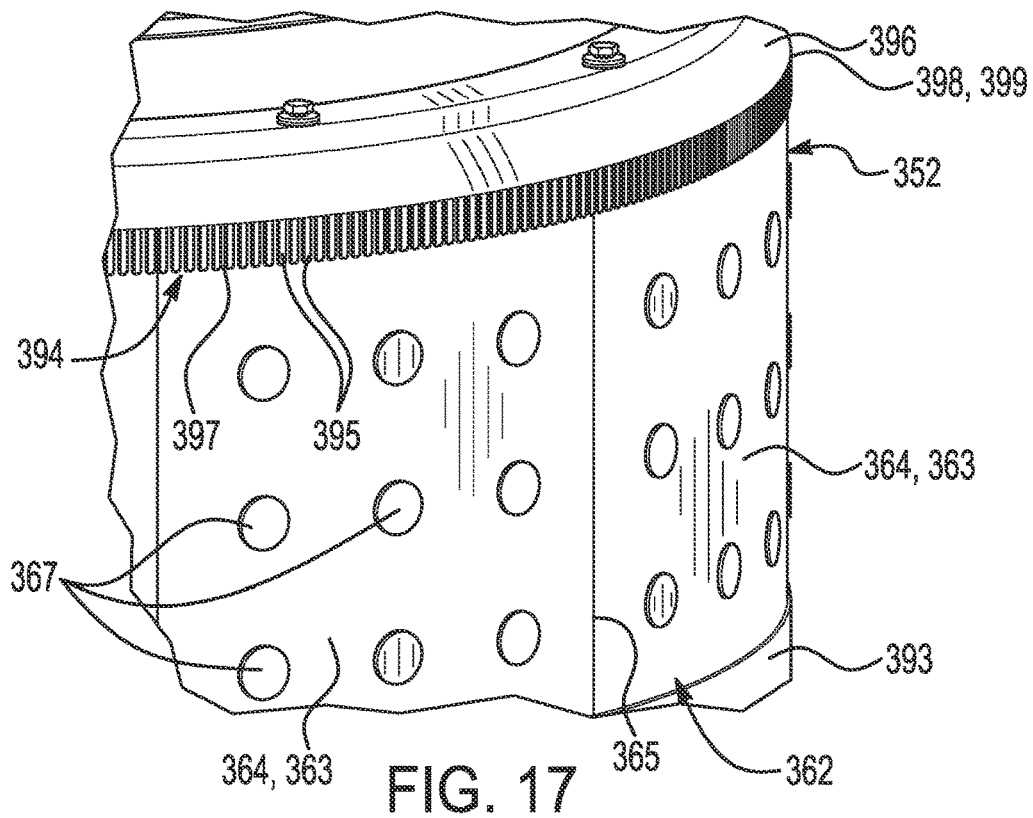
FIG. 17 is an enlarged view of a mold cavity of the mold ring of FIG. 15.

With reference now to FIGS. 15-17, an embodiment of a mold ring 352 is presented. The mold ring 352 is suitable for installation in the continuous casting machines 50, 50' detailed elsewhere in this description, as well as the continuous casting machine set forth below. The mold ring 352 is designed and constructed to continuously cast a lead strip of a multitude of serially-connected bipolar battery foils that can subsequently be employed as current collectors in bipolar batteries. The bipolar battery foils produced can have a thickness throughout their extents that ranges from approximately 0.002 inches to 0.080 inches according to an embodiment, that ranges from approximately 0.002 inches to 0.015 inches according to another embodiment, that ranges from approximately 0.006 inches to 0.015 inches according to yet another embodiment, or that is approximately 0.010 inches per another embodiment; still, other thickness ranges and values are possible in other embodiments. The mold ring 352 has a mold cavity 362 that resides at its cylindrical outer surface 364. The mold cavity 362 is made-up of multiple individual foil molds 363 spanning wholly around the circumference of the mold ring 352. Each foil mold 363 is demarcated in FIGS. 15-17 by axially- and vertically-directed partition lines 365 that serve to indicate first and second terminal sides of the ultimately-produced bipolar battery foils (axial is used in reference to the annular and cylindrical shape of the mold ring 352). The partition lines 365, while shown in the figures, need not physically exist in the mold cavity 362, and rather are intended as merely indicative of individual bipolar battery foils; still, in other embodiments the partition lines 365 can indeed be a physical structure that generates a perforation construction between successive bipolar battery foils in order to facilitate subsequent and downstream separation and severing therebetween. The continuous lead strip of foils can be severed in a subsequent and downstream cutting procedure at locations on the lead strip that correspond to the partition lines 365. Each foil mold 363 constitutes an individual bipolar battery foil and hence an individual current collector for a bipolar battery.

With continued reference to the embodiment of FIGS. 15-17, the mold ring 352 is provided with a runner system 394. The runner system 394 fluidly communicates with the mold cavity 362 and with the foil molds 363 in order to facilitate and ease the supply and delivery of liquid lead to the mold cavity 362 and to the foil molds 363. The supply and delivery of liquid lead is pumped to the mold cavity 326, yet not pressurized against the mold cavity 326, per an embodiment. Amid use of the larger continuous casting machine and system, liquid lead accesses the mold cavity 362 and the foil molds 363 via the runner system 394, and flows therethrough. The runner system 394 guides distribution of liquid lead to the mold cavity 362 and to the foil molds 363. The runner system 394 is located adjacent a top end 398 of the mold ring 352 and immediately downstream of a circumferentially continuous groove 396 which initially accepts supply of liquid lead for delivery to the mold cavity 362 and to the foil molds 363. Liquid lead flows from the groove 396 and to and through the runner system 394 as it makes its way to the mold cavity 362 and to the foil molds 363. The runner system 394 is located at an upper axial end 399 of the mold ring 352. The runner system 394 can take different forms in different embodiments. In the embodiment of FIGS. 15-17, and with particular reference to FIG. 17, the runner system 394 includes a multitude and set of ribs 395. The ribs 395 span circumferentially continuously around the mold ring 352 at the upper axial end 399. Each rib 395 has an elongated and axially-directed shape, and projects radially-outwardly from the outer surface 364 (again here, axially and radially are used in reference to the annular and cylindrical shape of the mold ring 352). The ribs 395 are spaced circumferentially apart from one another. Channels 397 reside between a pair of side-by-side and neighboring ribs 395. The channels 397 serve as flues for the flow of liquid lead. Like the ribs 395, the channels 397 are elongated in the axial direction. Liquid lead is permitted to flow through the channels 397, but is restricted from flowing at the ribs 395. The channels 397 are open to the groove 396 and fluidly communicate therewith. When assembled in place, the belt 54 makes surface-to-surface abutment with the ribs 395.

In this embodiment, the mold ring 352 has a multitude of protrusions 367 located at the mold cavity 362 and projecting radially-outwardly from the outer surface 364. The protrusions 367 serve as standoffs that maintain an axial and radial clearance between confronting and opposed surfaces of the belt 54 and mold ring 352 (i.e., the outer surface 364) when the belt 54 is assembled over the mold ring 352. The protrusions 367 make surface-to-surface abutment with the confronting and inside surface of the belt 54. Liquid lead flows through the axial and radial clearance at the mold cavity 362 and at the foil molds 363. Each foil mold 363 has a total of nine protrusions 367 in this example that are equally allocated over the foil mold 363. Each protrusion 367 is circular in shape, has a 1.0 inch diameter, and has a 0.010 inch height according to this example; still, the protrusions could have other quantities including more or less than nine, could have other shapes, and could have other sizes in other examples. The protrusions 367 establish corresponding holes (introduced below) in the produced bipolar battery foil and hence in the bipolar battery current collector. The ribs 395 also contribute in keeping the belt 54 in spaced confrontation with the outer surface 364, as well as a raised step and formation 393 located at an opposite lower axial end 391 of the mold ring 352. The formation 393 spans continuously around the circumference of the mold ring 352. The belt 54 makes surface-to-surface abutment with confronting and outer surfaces of the ribs 395 and of the formation 393.

Figure 18:
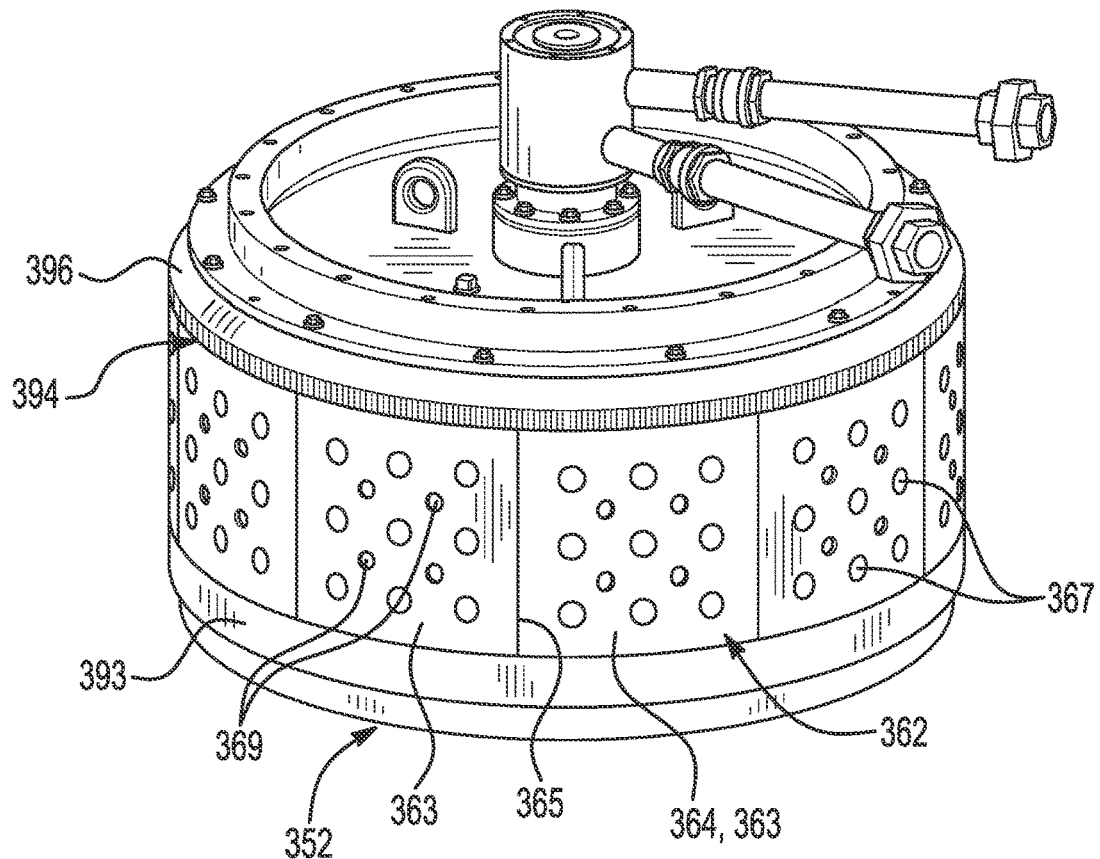
FIG. 18 is a perspective view of another embodiment of a mold ring that can be utilized to continuously cast a strip of a multitude of serially-connected bipolar battery foils.
Figure 19:
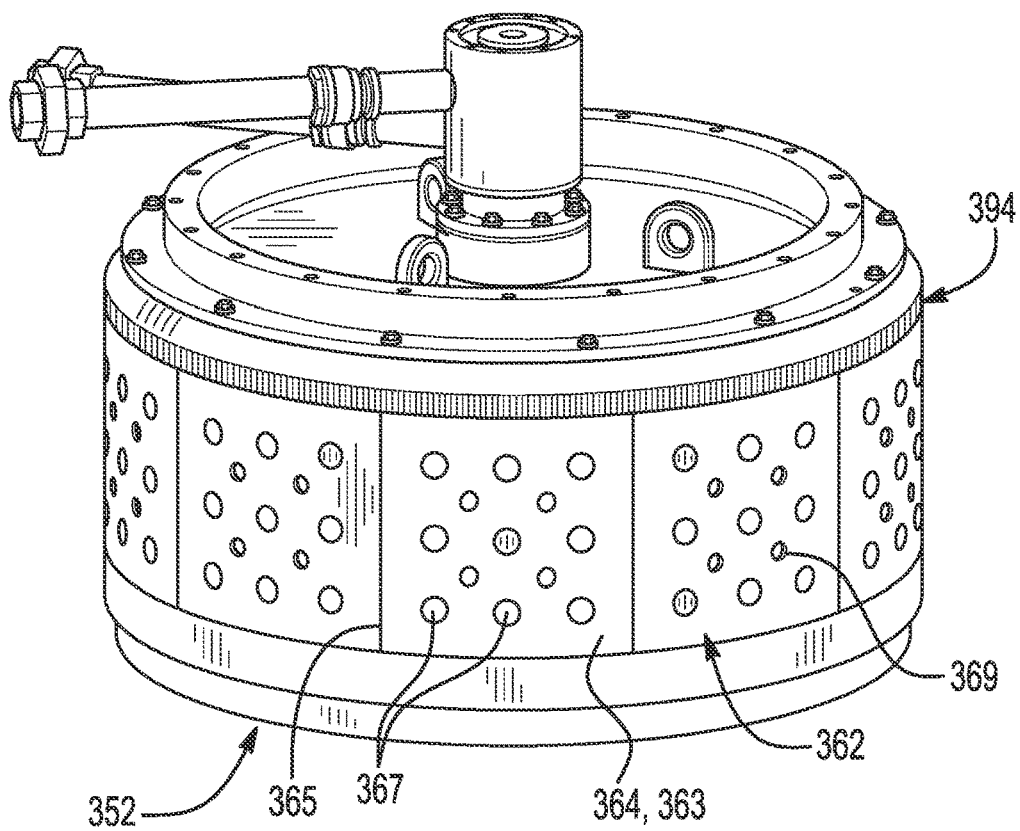
FIG. 19 is another perspective view of the mold ring of FIG. 18.
Figure 20:
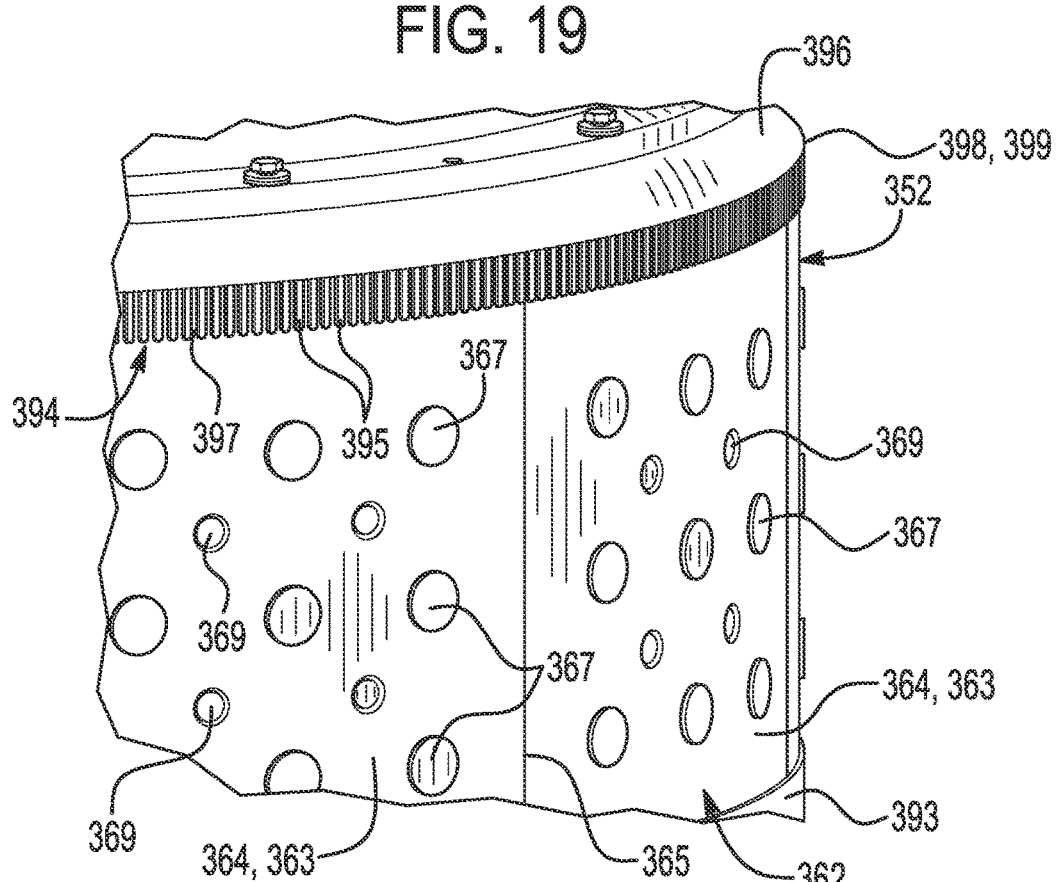
FIG. 20 is an enlarged view of a mold cavity of the mold ring of FIG. 18.

Bipolar battery current collectors may have certain features in their design and construction, and hence the bipolar battery foils may too have certain features in their design and construction. In the embodiment of FIGS. 18-20, for example, the bipolar battery foils have buttons (introduced below) in their structure. The buttons are four in total, according to this example, and are circular in shape and equally allocated and spaced apart; still, the buttons could have other quantities, other shapes, other sizes, and other patterns in other examples. In order to produce the desired buttons per this embodiment, the mold cavity 362 and its foil molds 363 has a multitude of depression molds 369 set radially-inwardly in the outer surface 364. Liquid lead flows into the depression molds 369, is received therein, and subsequently solidifies therein. Like the buttons they produce, the depression molds 369 are four in total and are circular in shape and equally allocated and spaced apart; still, the depression molds 369 could have other quantities, other shapes, and other patterns in other examples. Further, each depression mold 369 has a 0.350 inch diameter and has a 0.060 inch depth according to this example; still, the depression molds could have other sizes in other examples including greater or lesser diameters and depths. Moreover, in order to facilitate release and removal of the strip of bipolar battery foils from the mold cavity 362 once solidified, the depression molds 369 are provided with a draft angle at its side wall.

Figure 21:
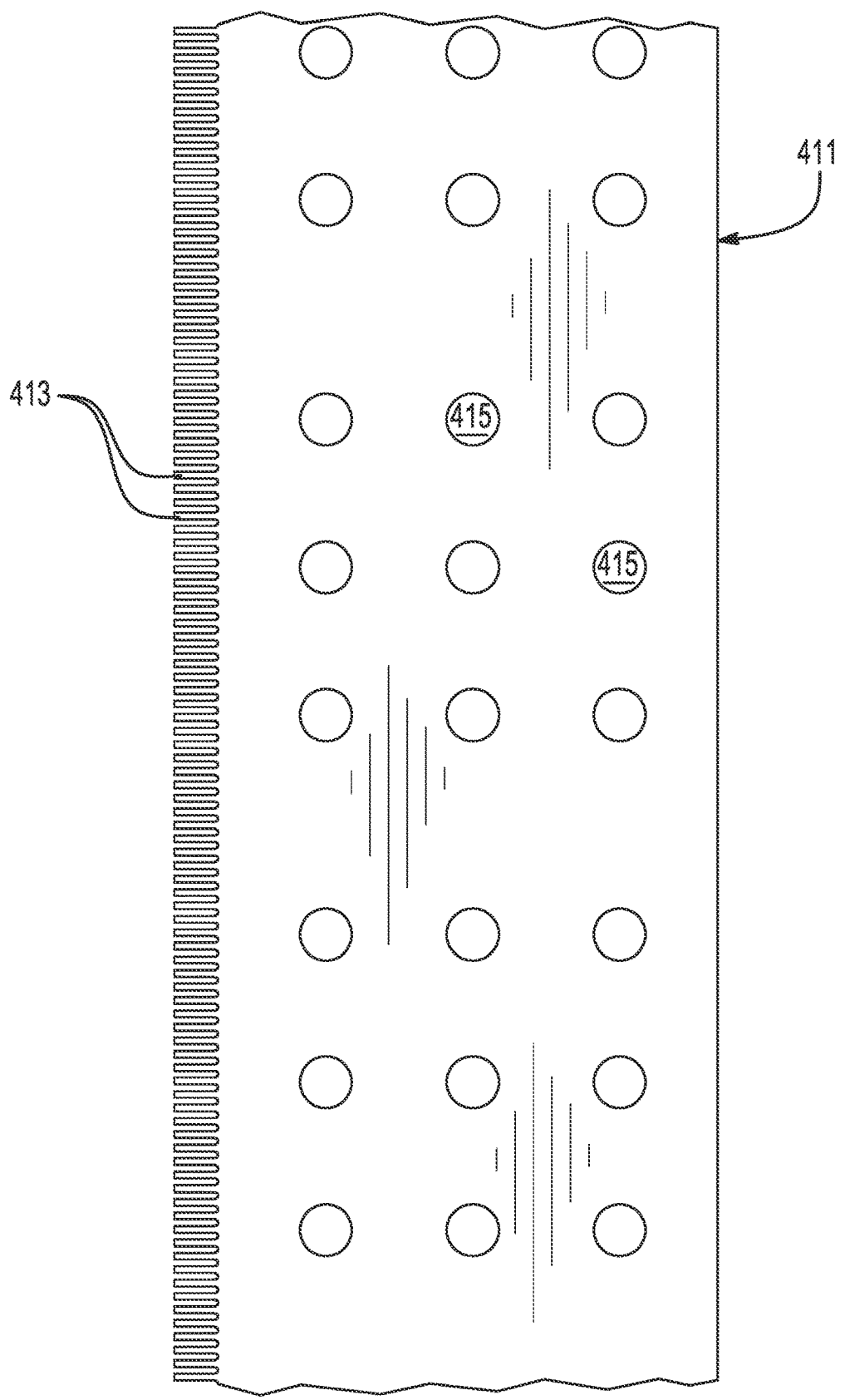
FIG. 21 is a plan view of an embodiment of a strip of a multitude of connected bipolar battery foils.
Figure 22:
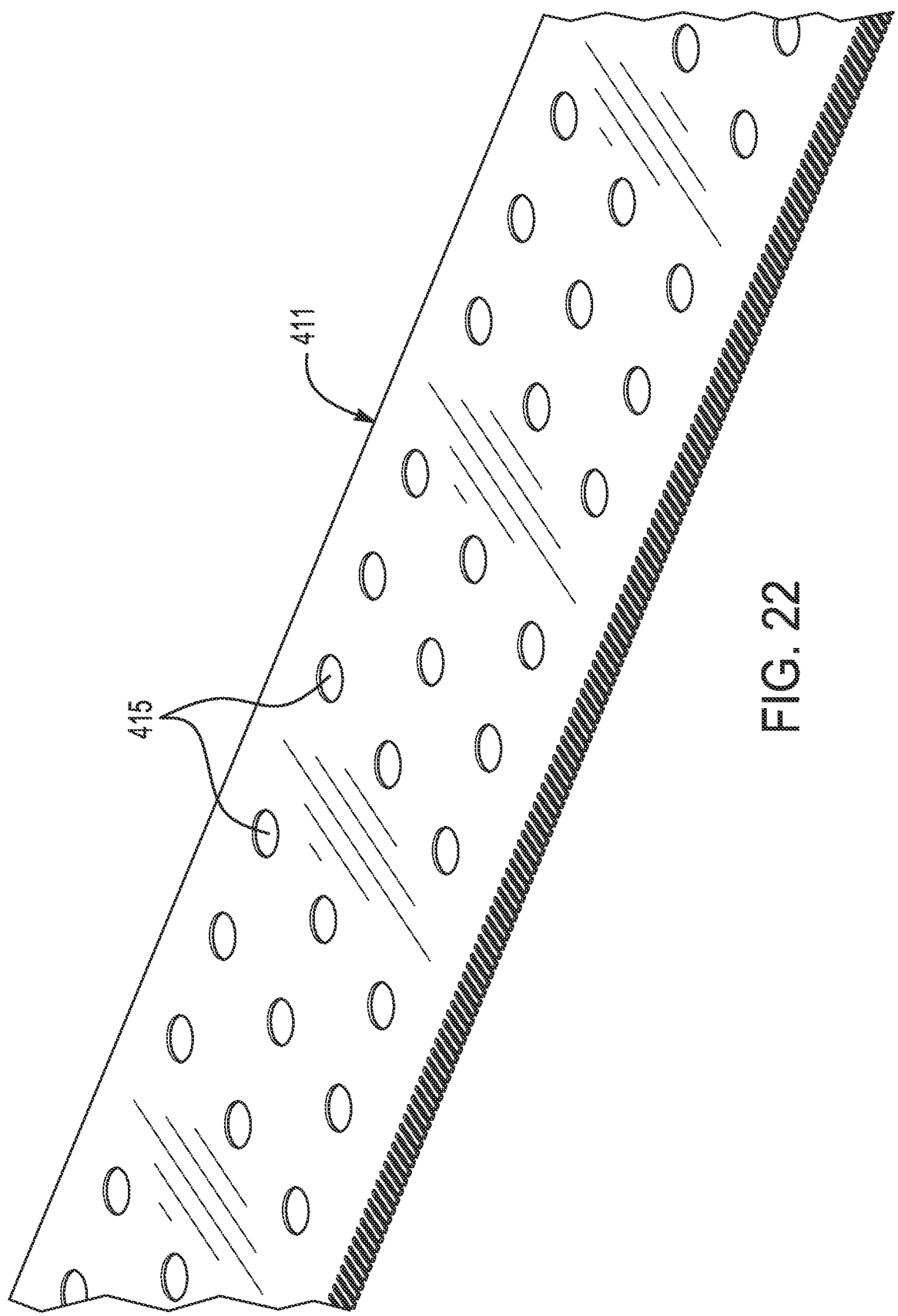
FIG. 22 is a perspective view of the strip of battery foils of FIG. 21.
Figure 23:
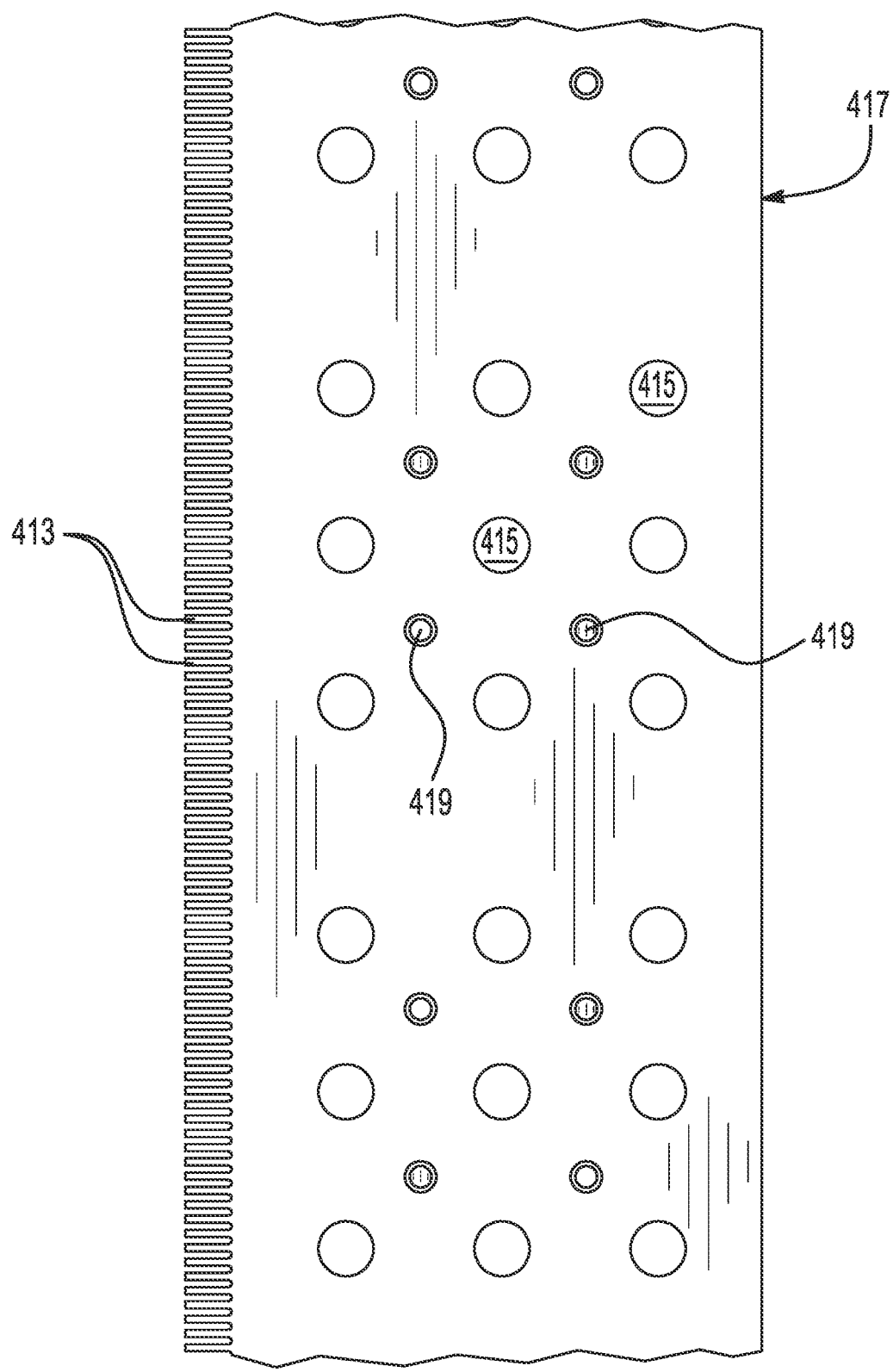
FIG. 23 is a plan view of another embodiment of a strip of a multitude of connected bipolar battery foils.
Figure 24:
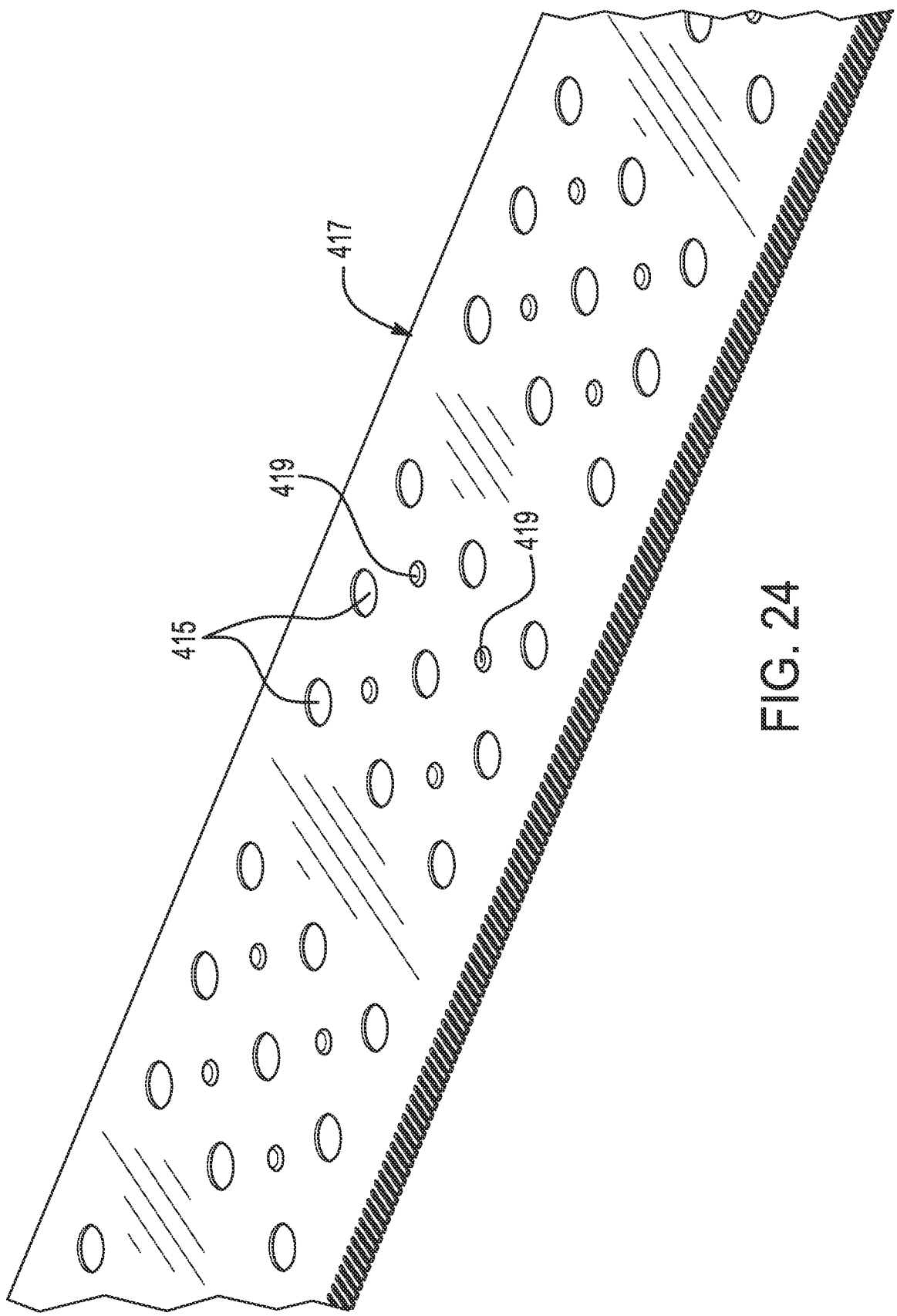
FIG. 24 is a perspective view of the strip of battery foils of FIG. 23.
Figure 25:
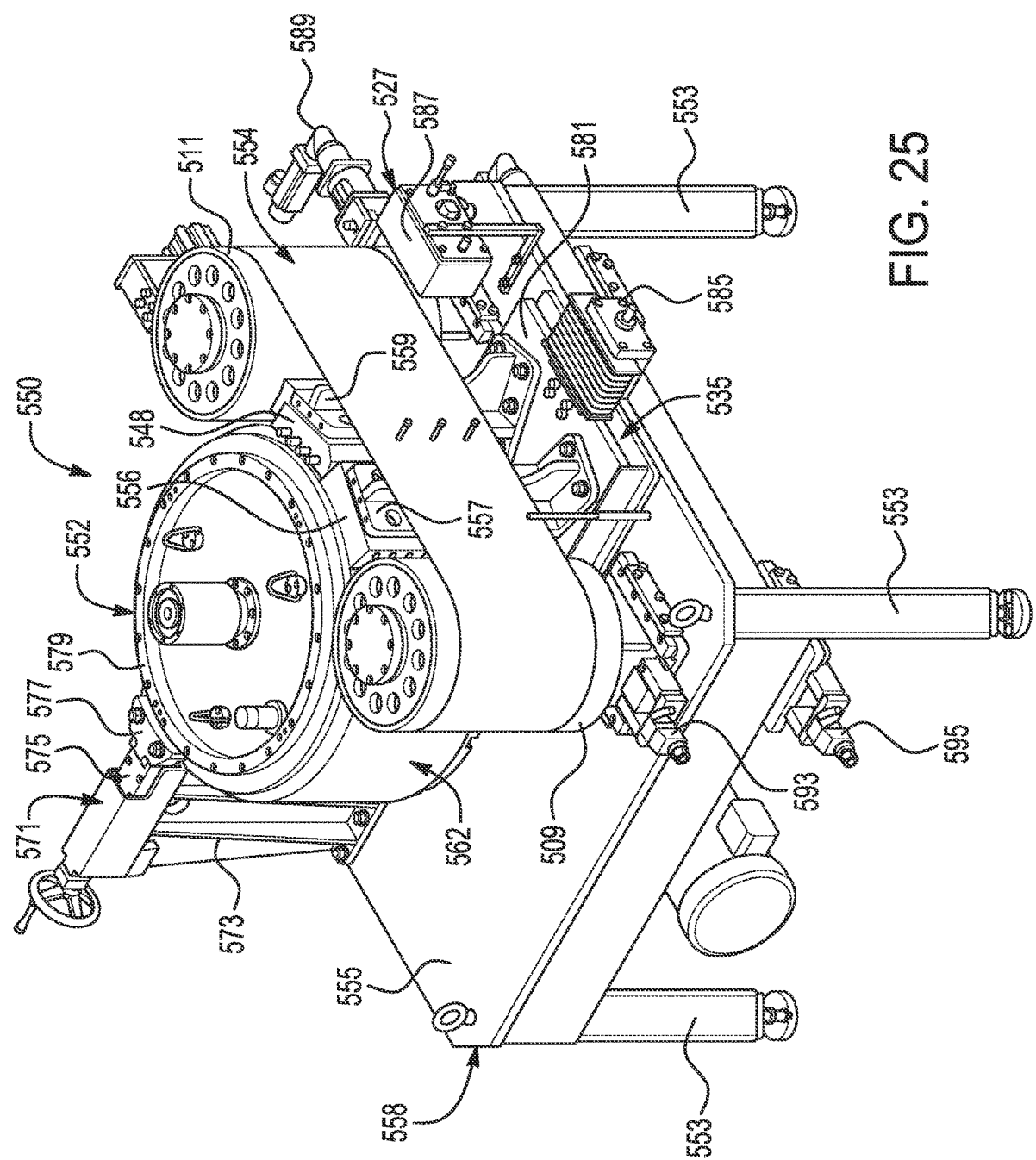
FIG. 25 is a perspective view of another embodiment of a machine for continuous casting a strip of a multitude of serially-connected bipolar battery foils and/or battery grids.
Figure 26:
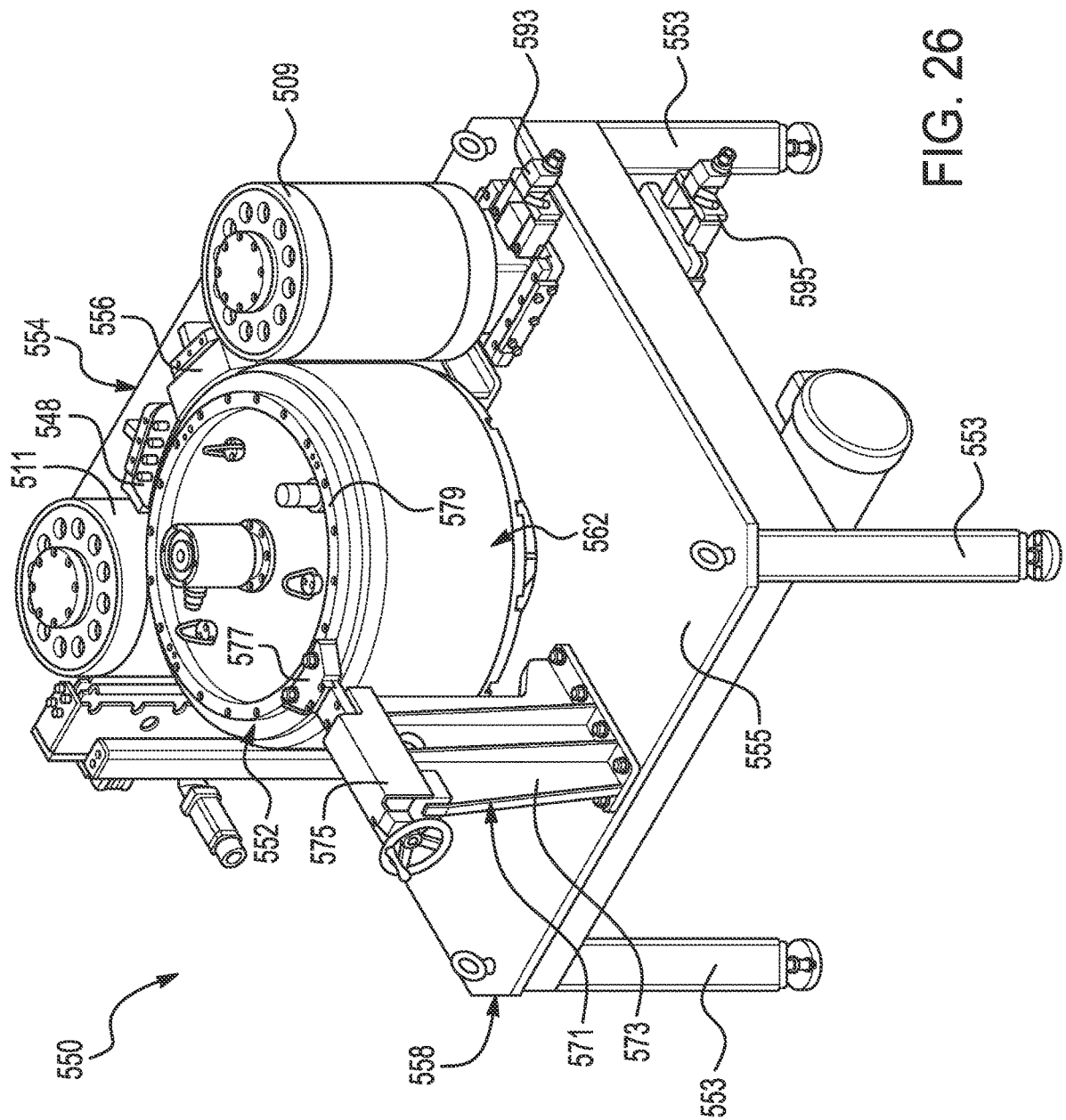
FIG. 26 is another perspective view of the machine of FIG. 25.
Figure 27:
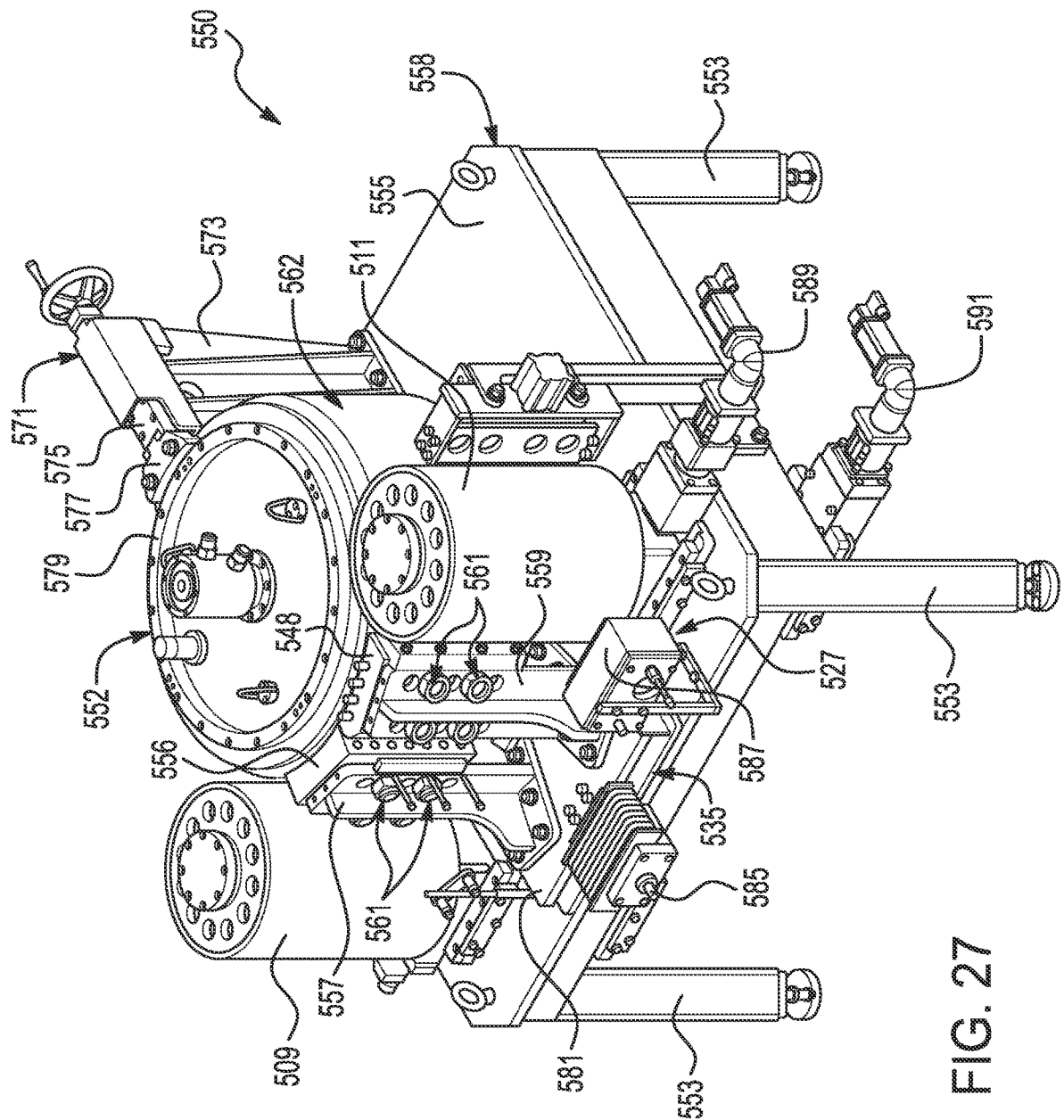
FIG. 27 is another perspective view of the machine of FIG. 25, having a belt removed for demonstrative purposes.
Figure 28:
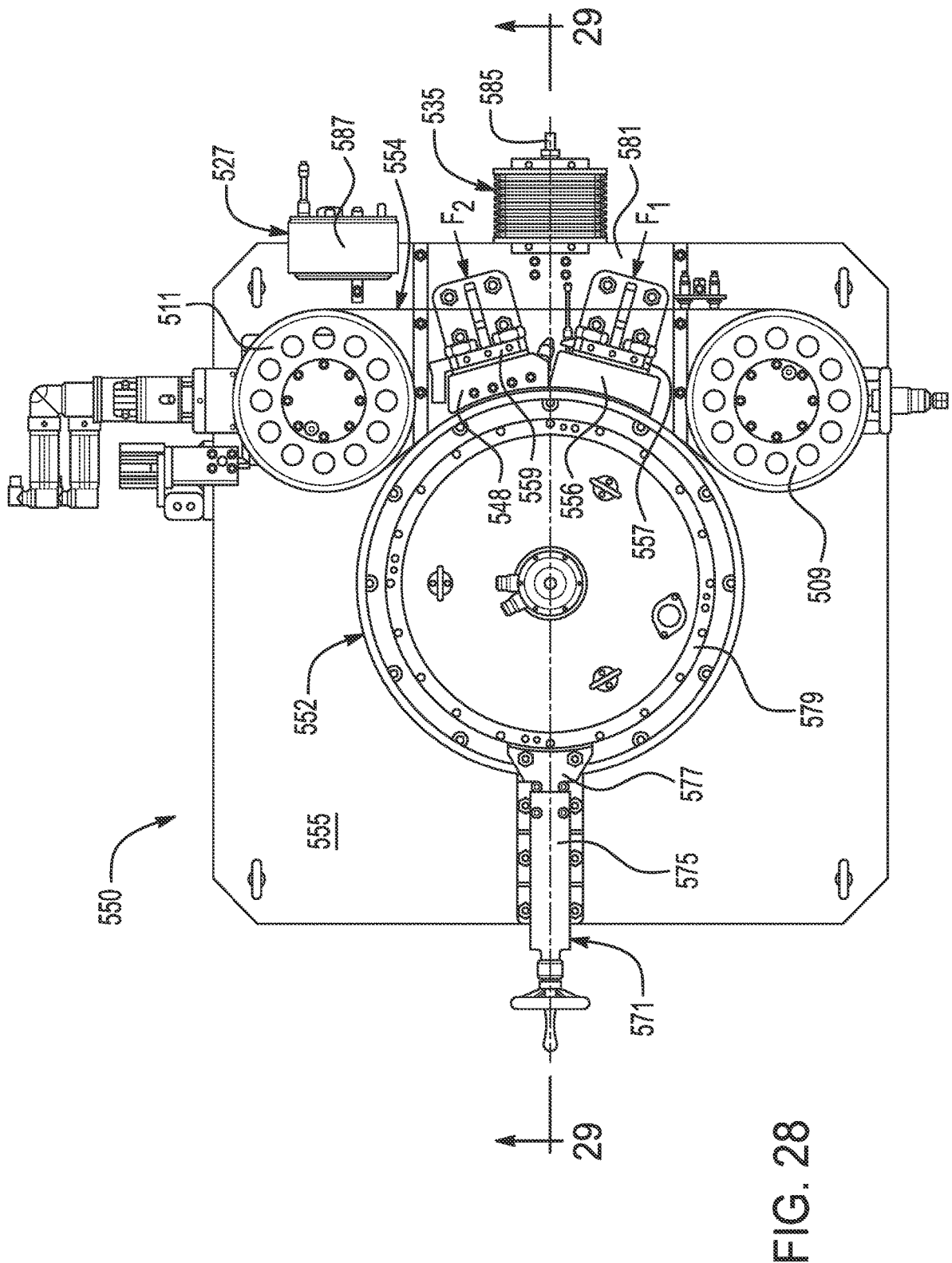
FIG. 28 is a top view of the machine of FIG. 25.
Figure 29:
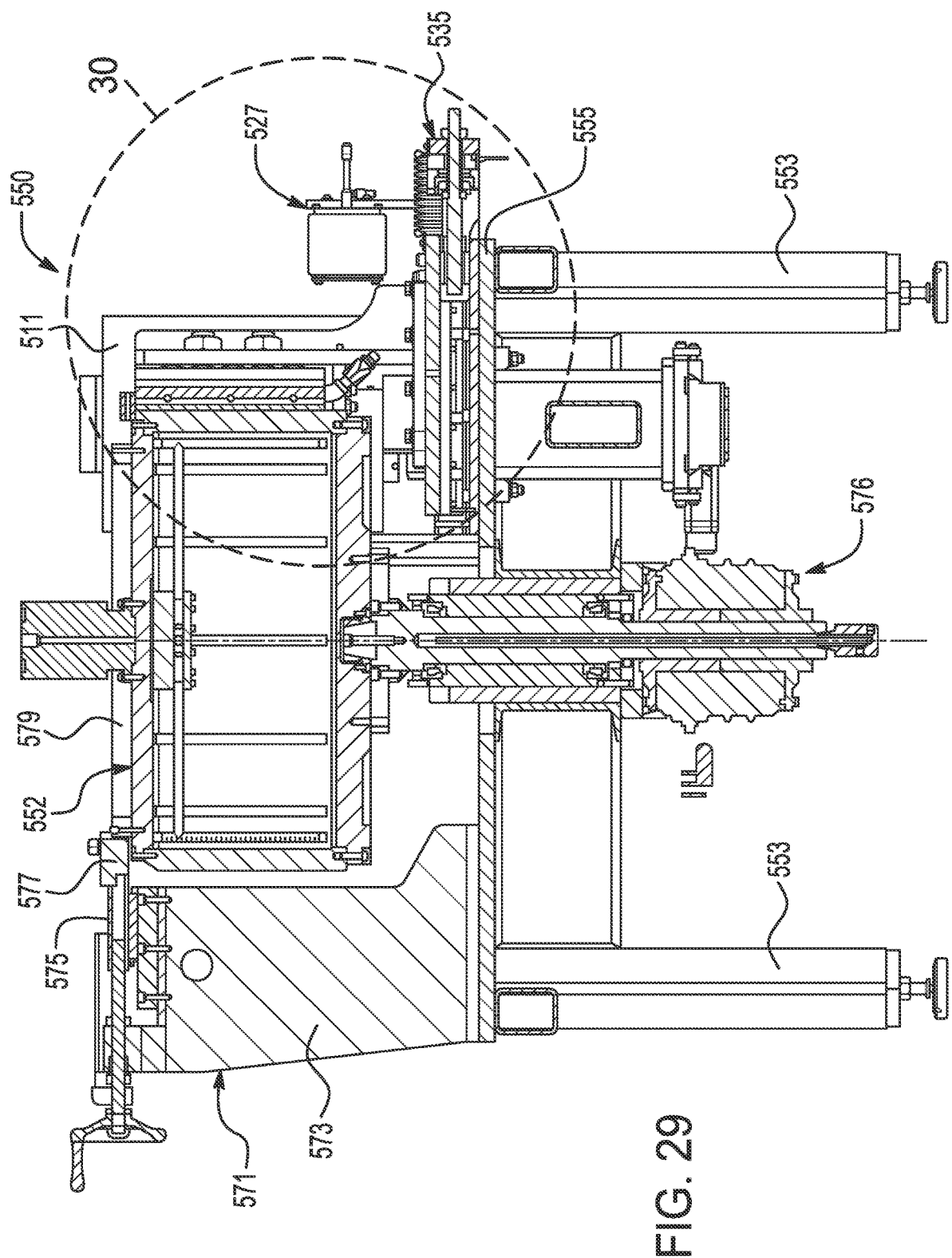
FIG. 29 is a sectional view taken at the arrowed-line 29-29 in FIG. 28.
Figure 30:
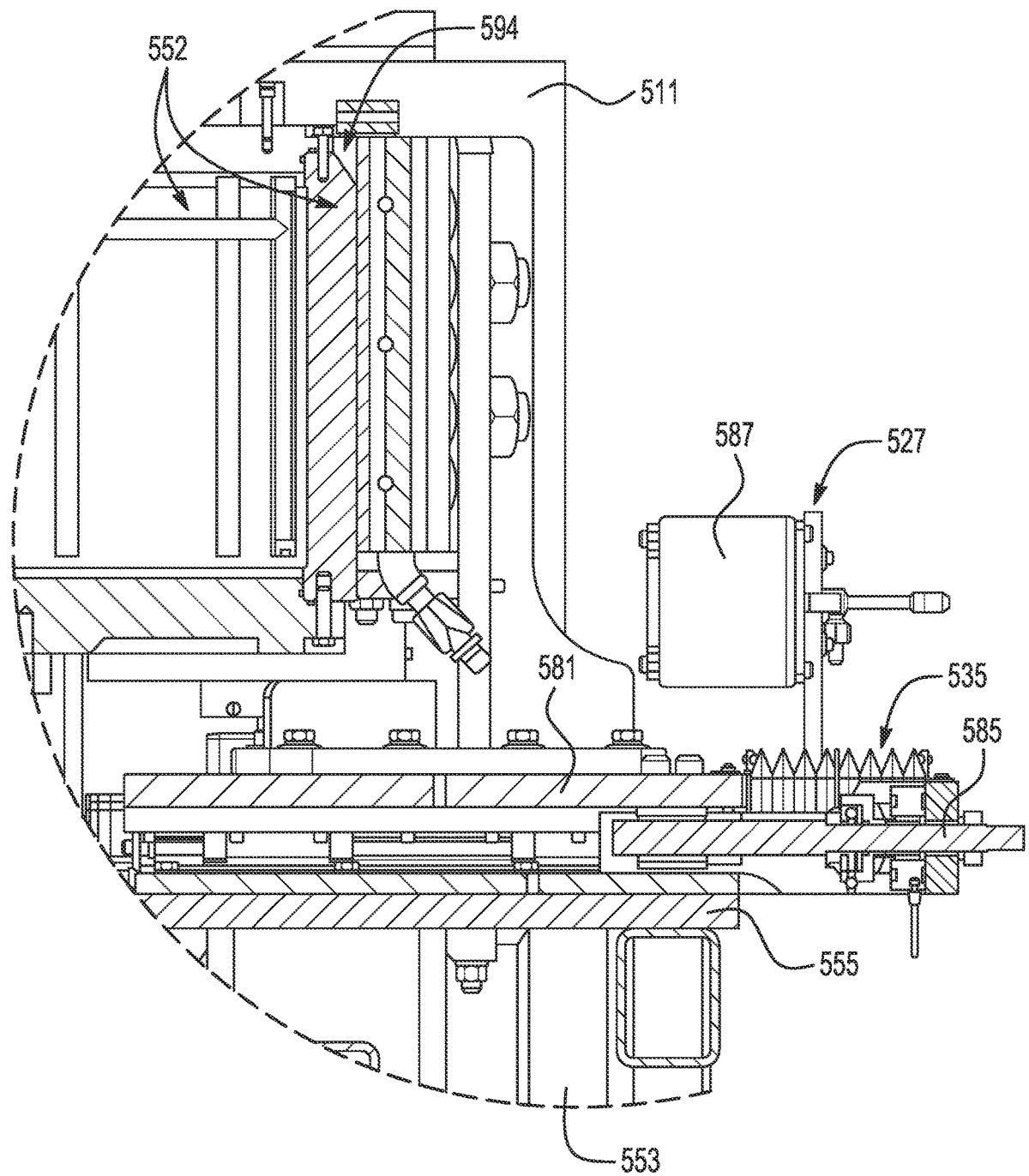
FIG. 30 is an enlarged view taken at the broken-line 30 in FIG. 29.
Figure 31:
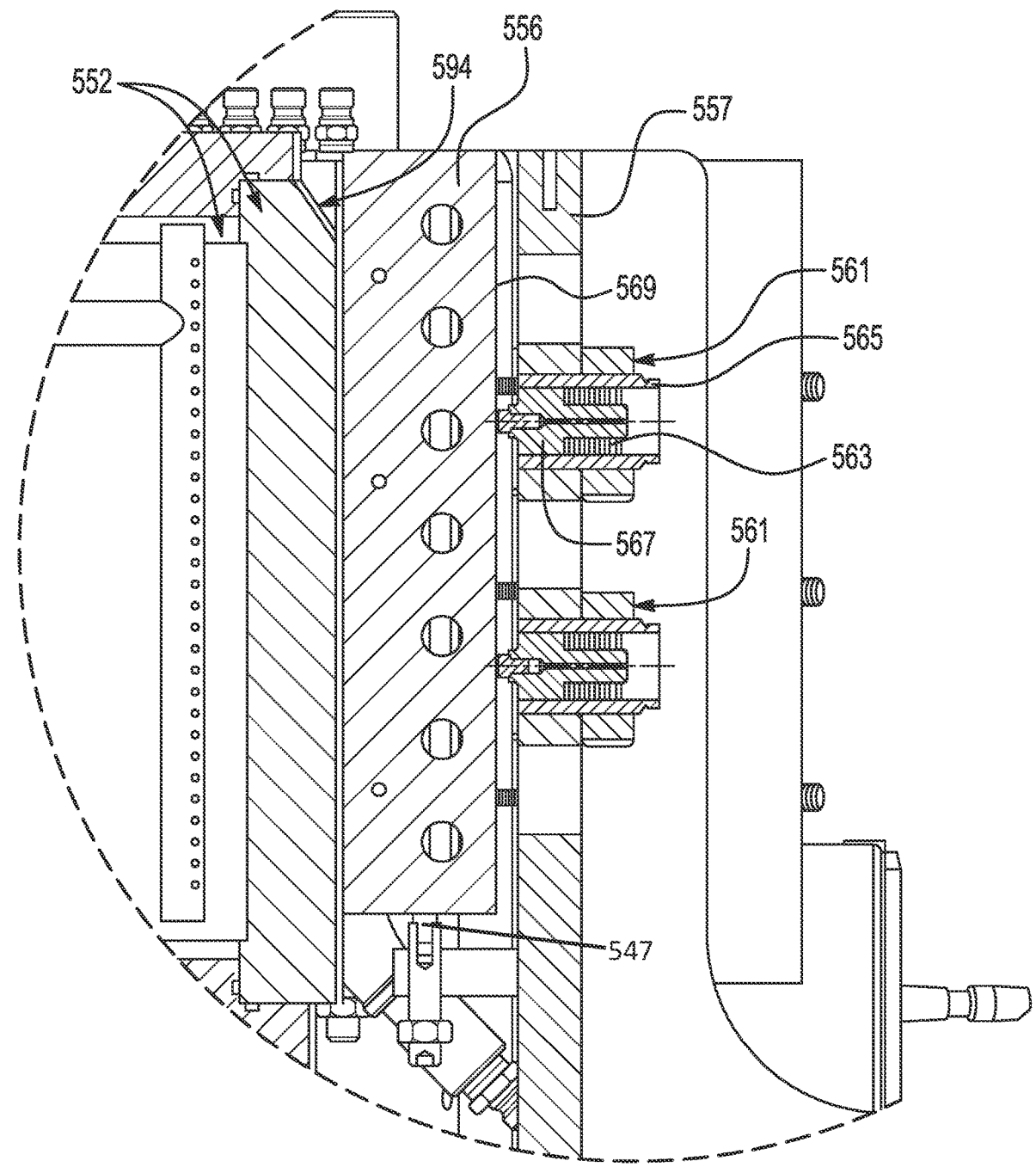
FIG. 31 is an enlarged, sectional view of spring mechanisms of a shoe of the machine of FIG. 25.

FIGS. 21-24 depict strips of a multitude of serially-connected bipolar battery foils that can subsequently be employed as current collectors in bipolar batteries. FIGS. 21 and 22 present a solidified strip of a multitude of serially-connected bipolar battery foils 411 that is produced by the mold ring 352 set forth in FIGS. 15-17. Extraneous extensions 413 are a consequence of the channels 397, and are severed and removed to provide a straight edge similar to that on the opposite side of the bipolar battery foil. Holes 415 are the result of the protrusions 367 of the mold ring 352. The holes 415 span wholly through the body of the battery foils 411. FIGS. 23 and 24 present a solidified strip of a multitude of serially-connected bipolar battery foils 417 that is produced by the mold ring 352 set forth in FIGS. 18-20. Again here, extraneous extensions 413 are a consequence of the channels 397, and are severed and removed to provide a straight edge similar to that on the opposite side of the bipolar battery foil. Buttons 419 are the result of the depression molds 369 of the mold ring 352 of FIGS. 18-20. Unlike the holes 415, the buttons 419 do not span wholly through the body of the battery foils 417.

With general reference now to FIGS. 25-35, another embodiment of a machine 550 and larger system and line 510 for continuously casting a strip of a multitude of serially-connected battery grids or bipolar battery foils, depending on the particular implementation, is depicted. The machine 550 in this embodiment shares many designs, constructions, and components with previous embodiments depicted and detailed herein, some of which may not be repeated in this description referencing FIGS. 25-35. In this embodiment, the machine 550 includes a mold ring 552, a movable belt 554, a first roller 509, a second roller 511, a heating shoe 556, a cooling shoe 548, a carriage assembly 535, and a belt tensioning assembly 527. Further, a frame 558 with legs 553 and a top 555 support the machine's primary components.

Depending on the implementation, the mold ring 552 can be designed and constructed to continuously cast a lead strip of a multitude of serially-connected bipolar battery foils, as previously described, or can be designed and constructed to continuously cast a lead strip of a multitude of serially-connected battery grids. A mold ring for producing battery grids is described in U.S. Pat. No. 10,981,218 having an issue date of Apr. 20, 2021 and owned by Wirtz Manufacturing Co., Inc., the assignee of the present patent—the details of such being hereby incorporated herein by reference. Accordingly, the mold ring 552 can be outfitted with a mold cavity 562 made up of multiple individual grid molds at its cylindrical outer surface, or made up of multiple individual foil molds at is cylindrical outer surface. The mold ring 552 can also have the runner system 594 (FIGS. 30, 31) with the set of ribs, as previously described and depicted in FIG. 17, as an example. An electric motor and gearbox assemblage 576 drives rotation of the mold ring 552 during use of the machine 550.

Figure 32:
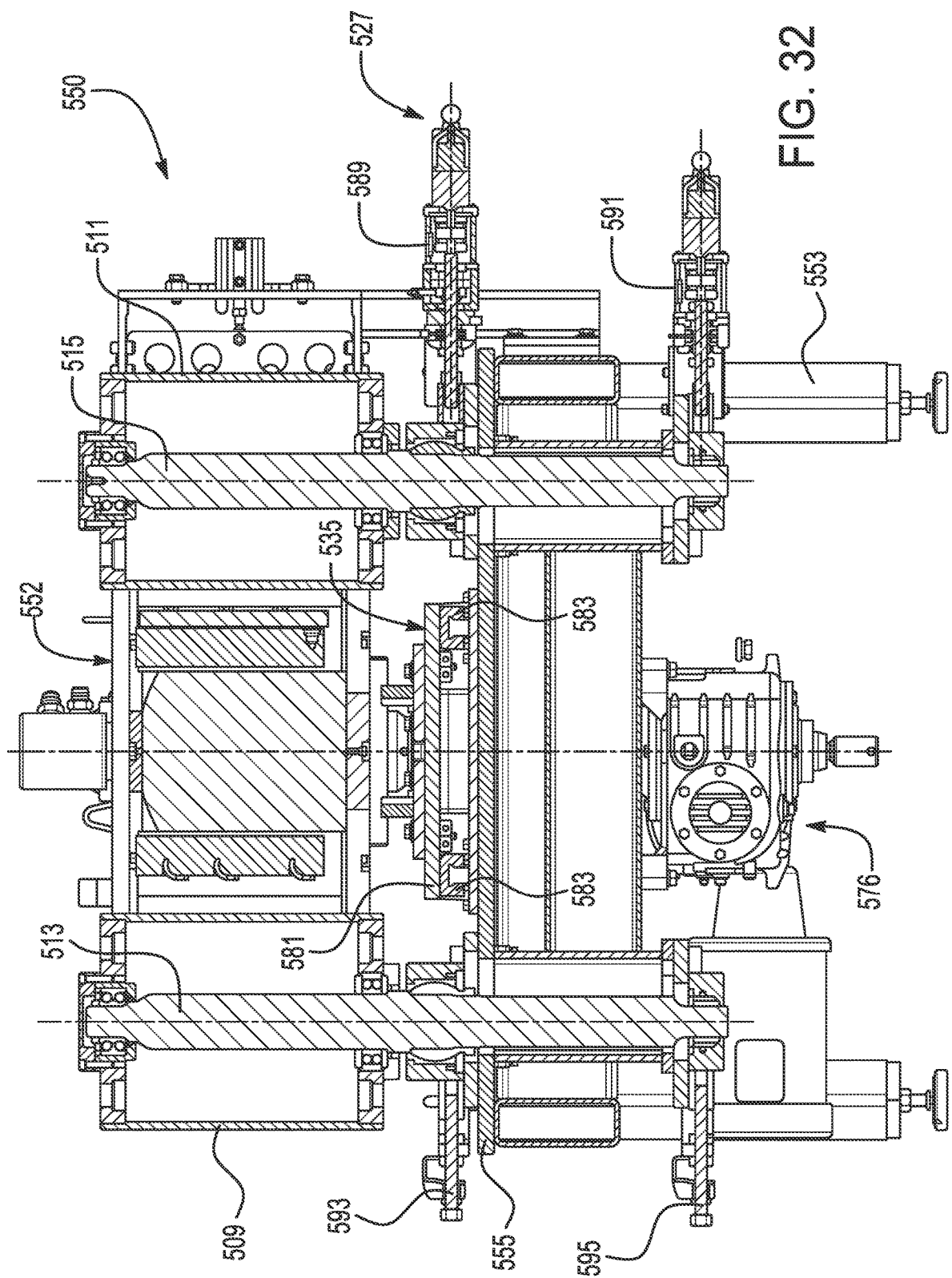
FIG. 32 is a sectional view taken at rollers of the machine of FIG. 25.

The movable belt 554 is supported for continuous movement during operation of the machine 550 via the first and second rollers 509, 511. The first roller 509 is situated on an upstream side of the heating and cooling shoes 556, 548, with respect to the rotational direction of the mold ring 552. The second roller 511, on the other hand, is situated on a downstream side of the heating and cooling shoes 556, 548, relative to the rotational direction of the mold ring 552. The first roller 509 is mounted at the frame's top 555 and journaled for rotation thereat via a first shaft 513 (FIG. 32). The first shaft 513 spans vertically above the frame's top 555 and vertically below the frame's top 555, as illustrated in FIG. 32. In a similar manner, the second roller 511 is mounted at the frame's top 555 and journaled for rotation thereat via a second shaft 515. The second shaft 515 spans vertically above the frame's top 555 and vertically below the frame's top 555.

In this embodiment, and with particular reference to FIGS. 27-31, the heating and cooling shoes 556, 548 are situated immediately next to each other, with the heating shoe 556 located upstream relative to the cooling shoe 548. The heating shoe 556 is situated at the site of liquid lead supply and delivery between the mold ring 552 and movable belt 554 in order to promote complete filling with liquid lead of the complete vertical extent of the circumferential portion of the mold cavity 562 subject to liquid lead delivery. Liquid lead is delivered via gravity feeding, as previously set forth. Coolant supply and return lines 549 (FIG. 33) communicate with the interior of the cooling shoe 548 to provide a decreased temperature at the cooling shoe 548. To present the heating and cooling shoes 556, 548 in direct and immediate confrontation with an opposing surface of the movable belt 554, the heating shoe 556 is supported by a first pusher plate or vertical plate 557, and the cooling shoe 548 is supported by a second pusher plate or vertical plate 559. The first and second vertical plates 557, 559 are arranged in a vertical orientation with respect to the frame's top 555. The mounting between the heating shoe 556 and first vertical plate 557, as well as that between the cooling shoe 548 and second vertical plate 559, supports the shoes 556, 548 vertically, yet permits slightly forward and horizontally-directed motions of the shoes 556, 548 relative to the vertical plates 557, 559 and relative to the mold ring 552. This mounting construction can be effected, per an example, via an arrangement in which the shoes 556, 548 are seated on pins or buttons 547 (FIG. 31) that extend vertically upward from a horizontal bracket of the respective plate 557, 559. The shoes 556, 548, in a sense, float on the pins 547 and are able to slightly move thereon toward the mold ring 552.

The forward motions of the heating and cooling shoes 556, 548 provides enhanced engagement between the shoes 556, 548 and the movable belt 554. One or more spring mechanisms 561 can be provided to yieldably bias the heating and cooling shoes 556, 548 toward and into engagement with the movable belt 554 for increased urging force applied thereat. The spring mechanisms 561 are carried by the first and second vertical plates 557, 559, and can have various constructions and quantities in varying embodiments. In this embodiment, and with particular reference to FIGS. 27 and 31, there are four spring mechanisms 561 mounted at the first vertical plate 557 and, likewise, four spring mechanisms 561 mounted at the second vertical plate 559. Each spring mechanism 561 here has as its main components a spring 563, a sleeve 565, and a pin or lug 567. The spring 563 biases the pin 567 into direct abutment with backsides 569 of the heating and cooling shoes 556, 548, and with respect to the sleeve 565 and first and second vertical plates 557, 559. The heating and cooling shoes 556, 548 are hence urged against the movable belt 554 which is, in turn, urged against the mold ring 552 at the mold cavity 562. A momentary cavity that accepts liquid lead is thereby established and defined via a clearance residing between the movable belt 554 and mold cavity 562. A first force $F_1$ (FIG. 28) applied and exerted by the heating shoe 556 against the movable belt 554 and against the mold ring 552 may be approximately equal and equivalent to a second force $F_2$ applied and exerted by the cooling shoe 548 against the movable belt 554 and against the mold ring 552, according to certain embodiments.

To counteract these forces and help ensure steadiness of the mold ring 552 amid use of the machine 550, a stabilizer assembly 571 is provided that engages the mold ring 552 at a circumferential location generally opposite and opposed to the first and second forces $F_1$, $F_2$, and generally opposite and opposed to the heating and cooling shoes 556, 548 relative to the mold ring's circumference. The stabilizer assembly 571, according to this embodiment, is mounted via bolting to the frame's top 555. A vertical bar 573 extends from the frame's top 555, and a horizontal arm 575 depends from the vertical bar 573. The horizontal arm 575 has a head 577 that can be manually moved toward and away from a ring or flanged rim 579 of the mold ring 552 in order to engage the flanged rim 579. The head 577 can come into direct abutment with the flanged rim 579, yet does not restrict rotation of the mold ring 552 during its operation. Once engaged and abutted, the head 577 is secured against counter movement in order to counteract forces that could otherwise destabilize the mold ring 552 amid use of the machine 550.

The carriage assembly 535 serves to move the first and second vertical plates 557, 559—and hence the heating and cooling shoes 556, 548—toward and away from the movable belt 554 and the mold ring 552 for engagement and disengagement actions thereat and therebetween. The carriage assembly 535 can have varying designs, constructions, and components in various embodiments. In this embodiment, and with particular reference to FIGS. 25, 27, 30, and 32, the carriage assembly 535 includes a table or horizontal platform 581, a pair of linear bearing assemblies 583, and a screw 585. The horizontal platform 581 is mounted on the frame's top 555 via the linear bearing assemblies 583, and moves with respect to the frame's top 555. The first and second vertical plates 557, 559 are mounted via bolting directly to the horizontal platform 581, and hence are carried thereby. Because both of the first and second vertical plates 557, 559 are mounted to the same and single horizontal platform 581, per this embodiment, the first and second vertical plates 557, 559 and the heating and cooling shoes 556, 548 are moved concurrently, and at the same time, together with movement of the horizontal platform 581. In this way, the heating and cooling shoes 556, 548 can more readily exhibit the same engagement movement and engagement force against the movable belt 554 and mold ring 552 via the carriage assembly 535. Linear movement of the horizontal platform 581, per this embodiment, is carried out by way of the screw 585. The screw 585 is in the form of an acme screw that can have one or more complementary nuts or sleeves that move linearly along the screw upon rotation thereof. The acme screw can be manually turned via a wrench, according to this example. Still, movement of the horizontal platform 581 can be imparted in other ways, such as via mechanical motorization or hydraulic actuation, as examples of more automated control arrangements.

The belt tensioning assembly 527 serves to adjust and maintain the desired tension of the movable belt 554 on the first and second rollers 509, 511 amid use of the machine 550. It has been found that, in certain circumstances, the movable belt 554 can migrate slightly vertically up or down on the first and second rollers 509, 511 during use. Such migration is unwanted, as it could negatively impact the efficiency and effectiveness of the machine's operation. Without intending to be limited to a particular theory of causation, it has been shown that maintaining proper tensioning on the movable belt 554 can minimize or altogether preclude this unwanted occurrence. The belt tensioning assembly 527 can have varying designs, constructions, and components in various embodiments. In this embodiment, and with particular reference to FIGS. 25, 27, 28, and 32, the belt tensioning assembly 527 includes a sensing system 587, a first actuator 589, and a second actuator 591. The sensing system 587 monitors and tracks the position of the movable belt 554 on the second roller 511, according to this embodiment. In an example, the sensing system 587 is a laser sensing system that tracks the position of a bottom edge of the movable belt 554 relative to an intended position; still other types of sensing systems are possible in other embodiments. In a particular example, the laser sensing system can be an image-based laser sensor, model IX-080 supplied by KEYENCE CORPORATION OF AMERICA of Itasca, Illinois U.S.A.; still, other sensor products from other companies are possible in other examples.

Furthermore, the first and second actuators 589, 591 can be actuated and deactuated for engagement with the second shaft 515 and for imparting horizontal and radial movement of the second roller 511 relative to the frame's top 555 (radial used here with respect to the cylindrical shape of the roller). The first and second actuators 589, 591 automate control of the tension of the movable belt 554. The first actuator 589 engages the second shaft 515 at a first axial location and position thereof and vertically above the frame's top 555, and the second actuator 591 engages the second shaft 515 at a second axial location and position thereof and vertically below the frame's top 555. In the embodiment here, the first and second actuators 589, 591 are in the form of first and second linear servomotors, but could take other forms in other embodiments. Further, the first roller 509 and first shaft 513 can be equipped with first and second manual belt tensioners 593, 595 with bolts or screws, as previously described, that are turned via a wrench for imparting horizontal and radial movement of the first roller 509 relative to the frame's top 555.

Figure 33:
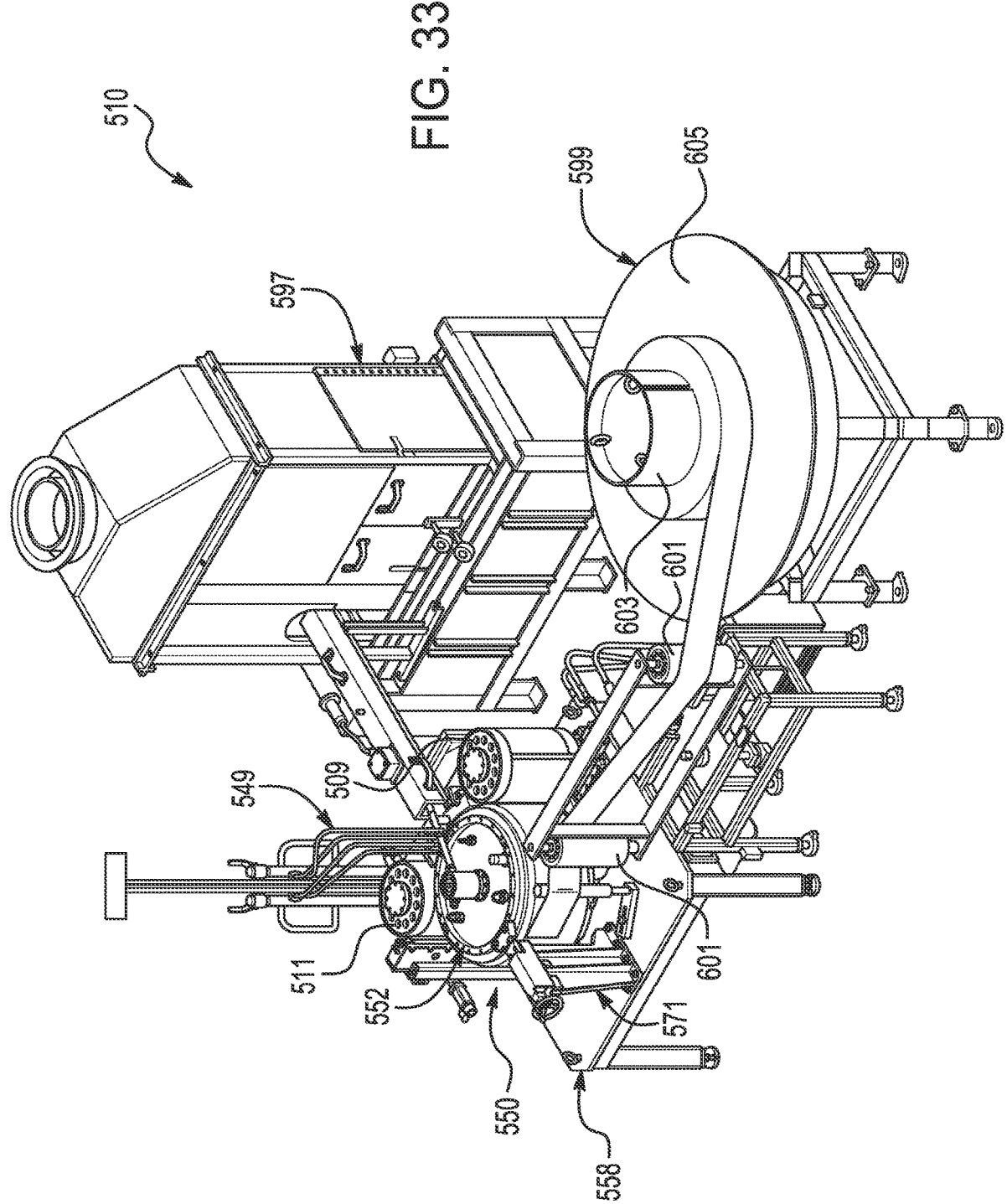
FIG. 33 is a perspective view of a system layout with the machine of FIG. and also depicting equipment for liquid lead supply and a coiler machine.
Figure 34:
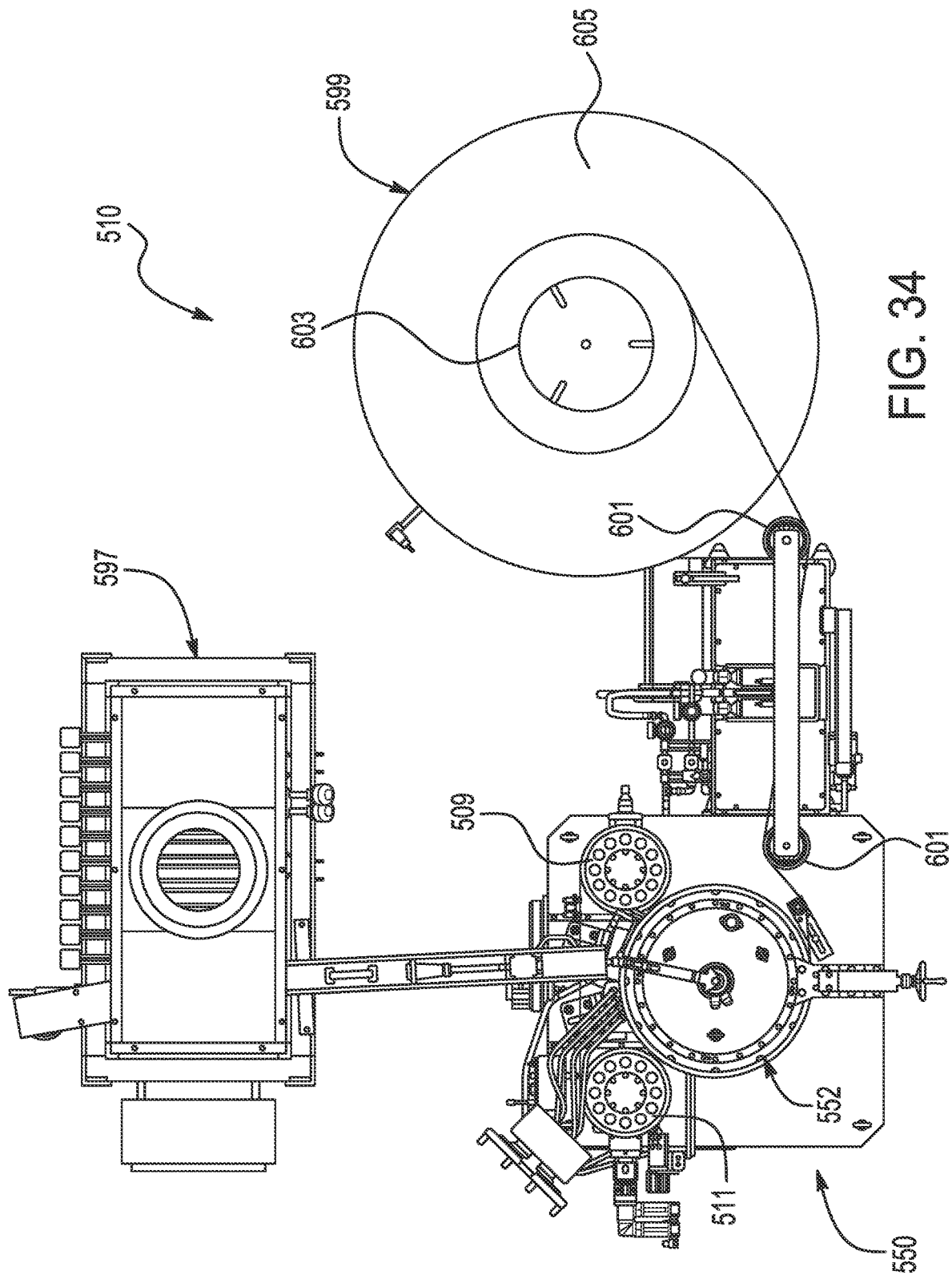
FIG. 34 is a top view of the system layout of FIG. 33.
Figure 35:
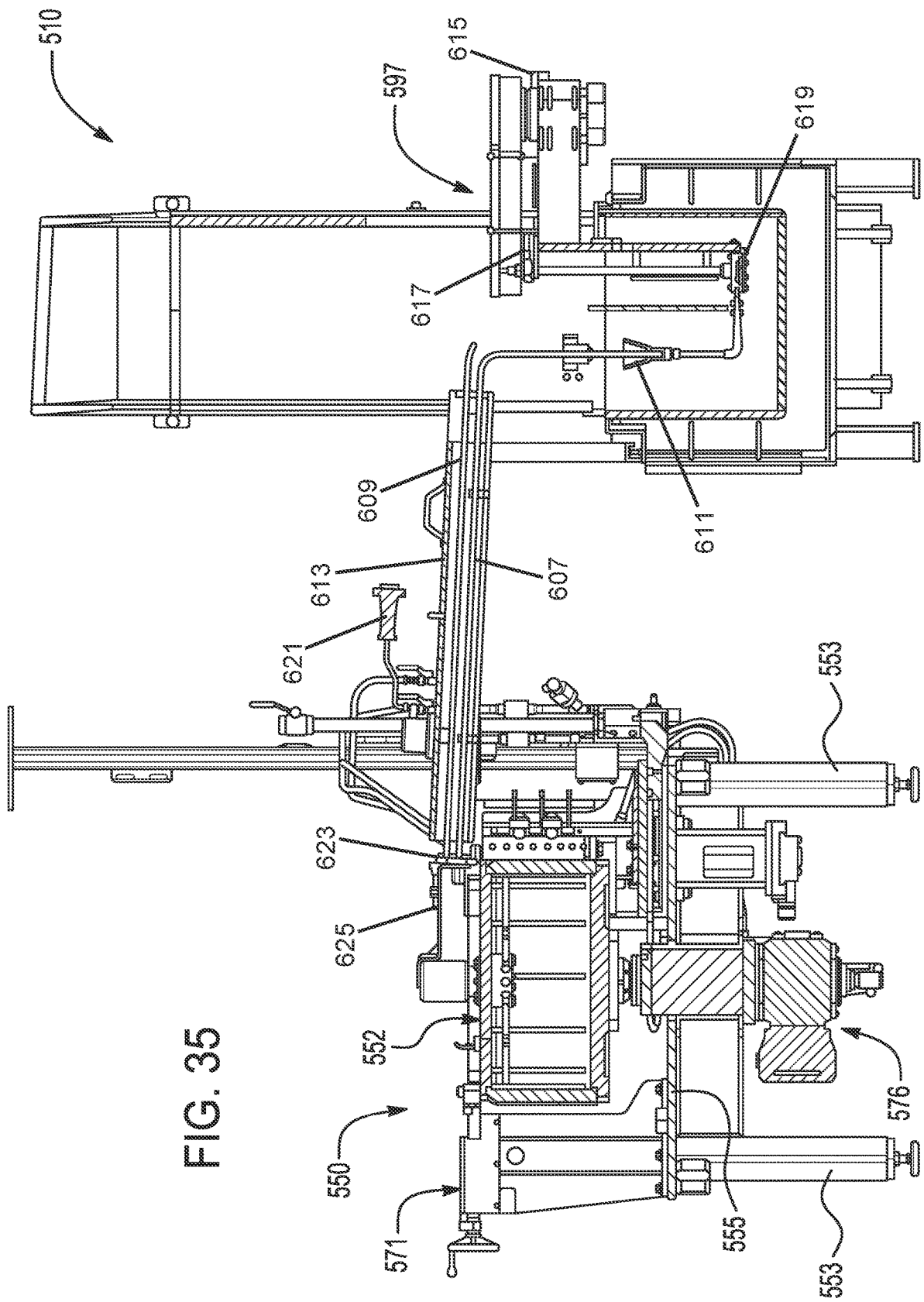
FIG. 35 is a sectional view of the system layout of FIG. 33.

With reference now to FIGS. 33-35, the continuous casting system and line 510 further includes, per this embodiment, a liquid lead supply and delivery system 597 and a coiling machine 599. The liquid lead supply and delivery system 597 is located upstream of the machine 550 and serves to provide lead and lead alloy in liquid form to the machine 550. In the embodiment here, the liquid lead supply and delivery system 597 includes a feed line 607, a return line 609, a feed line insertion 611, an electric heater housing 613, a motor 615, a belt 617, and a pump 619. The electric heater housing 613 houses the feed and return lines 607, 609. An electric heater plug 621 is also provided. The pump 619 is driven to operate via the motor 615 and belt 617. Furthermore, a nozzle 623 feeds liquid lead to the runner system 594, and is situated thereat. To permit adjustment of the nozzle 623 and its pour location, an adjustable arm 625 carries the nozzle 623. The coiling machine 599 is located downstream of the machine 550 and serves to wind the cast strip of battery grids or battery foils into a coil or roll. The coiling machine 599 includes guide rollers 601, a hub 603, and a roll supporting disk 605.

While multiple embodiments with various designs, constructions, and components have been detailed in the descriptions and depicted in the figures, it is contemplated that the designs, constructions, and components could be interchanged such that certain designs, constructions, and components could be combined and swapped with one another to provide embodiments of continuous casting machines of varying designs, constructions, and components.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used herein, the terms "general" and "generally" and "approximately" and "substantially" are intended to account for the inherent degree of variance and imprecision that is often attributed to, and often accompanies, any design and manufacturing process, including engineering tolerances—and without deviation from the relevant functionality and outcome—such that mathematical precision and exactitude is not implied and, in some instances, is not strictly possible. In other instances, the terms "general" and "generally" and "approximately" and "substantially" are intended to represent the inherent degree of uncertainty that is often attributed to any quantitative comparison, value, and measurement calculation, or other representation, such that mathematical precision and exactitude is not implied and, in some instances, is not strictly possible.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A machine for continuous casting a strip of a plurality of connected bipolar battery foils, the machine comprising:
    a mold ring rotatable about an axis, said mold ring having a mold cavity residing at a cylindrical outer surface of said mold ring, said mold cavity having a plurality of foil molds, each foil mold having a plurality of protrusions or a plurality of depression molds or both a plurality of protrusions and a plurality of depression molds, said mold ring having a runner system fluidly communicating with said mold cavity to facilitate delivery of liquid lead to said mold cavity;
    a movable belt having a face situated in confrontation with a circumferential region of said mold cavity of said mold ring, the liquid lead delivered to said mold cavity via said runner system flows between said face of said movable belt and said mold cavity of said mold ring;
    at least one shoe urging a section of said movable belt into engagement with said mold ring at least adjacent a location in which the liquid lead is delivered to said mold cavity via said runner system;
    a vertical plate carrying said at least one shoe;
    a horizontal platform carrying said vertical plate and movable relative to a frame of the machine toward and away from said mold ring, the movement bringing said vertical plate and said at least one shoe toward and away from said mold ring;
    at least one spring mechanism yieldably biasing said at least one shoe into engagement with said movable belt, said at least one spring mechanism located at said vertical plate and said at least one shoe yieldably biased with respect to said vertical plate; and
    a stabilizer assembly engaging said mold ring at a circumferential location generally opposed with respect to said at least one shoe.

2. The machine as set forth in claim 1, wherein each foil mold has said plurality of protrusions and lacks said plurality of depression molds, and said face of said movable belt makes surface-to-surface abutment with said plurality of protrusions.

3. The machine as set forth in claim 1, wherein each foil mold has said plurality of depression molds and lacks said plurality of protrusions.

4. The machine as set forth in claim 1, wherein each foil mold has both said plurality of protrusions and said plurality of depression molds, and said face of said movable belt makes surface-to-surface abutment with said plurality of protrusions.

5. The machine as set forth in claim 1, wherein said runner system has a plurality of ribs, said plurality of ribs are axially-directed and are circumferentially spaced apart from one another with elongated channels thereamong.

6. The machine as set forth in claim 1, wherein said runner system is located adjacent an axial end of said mold ring.

7. The machine as set forth in claim 1, wherein the strip of the plurality of connected bipolar battery foils has a thickness that ranges approximately between 0.006 inches and 0.015 inches.

8. The machine as set forth in claim 1, wherein the liquid lead delivered to said mold cavity via said runner system is a lead antimony alloy.

9. The machine as set forth in claim 1, wherein the liquid lead delivered to said mold cavity via said runner system is delivered to said mold cavity via gravity feeding delivery.

10. The machine as set forth in claim 1, further comprising at least one linear bearing assembly situated between said horizontal platform and the frame of the machine in order to facilitate movement of said horizontal platform toward and away from said mold ring.

11. A machine for continuous casting a strip of a plurality of connected bipolar battery foils, the machine comprising:
a mold ring rotatable about an axis, said mold ring having a mold cavity residing at a cylindrical outer surface of said mold ring, said mold cavity having a plurality of foil molds, each foil mold having a plurality of protrusions or a plurality of depression molds or both a plurality of protrusions and a plurality of depression molds, said mold ring having a runner system fluidly communicating with said mold cavity to facilitate delivery of liquid lead to said mold cavity;
a movable belt having a face situated in confrontation with a circumferential region of said mold cavity of said mold ring, the liquid lead delivered to said mold cavity via said runner system flows between said face of said movable belt and said mold cavity of said mold ring;
a heating shoe engaging said movable belt adjacent a location in which the liquid lead is delivered to said mold cavity;
a cooling shoe situated circumferentially next to said heating shoe and engaging said movable belt; and
a platform carrying both of said heating shoe and said cooling shoe, said platform movable with respect to said mold ring to concurrently bring said heating shoe and said cooling shoe toward and away from said mold ring.

12. The machine as set forth in claim 11, wherein a first force applied via said heating shoe via its engagement with said movable belt is approximately equivalent to a second force applied via said cooling shoe via its engagement with said movable belt.

13. A machine for continuous casting a strip of a plurality of connected bipolar battery foils, the machine comprising:
a mold ring rotatable about an axis, said mold ring having a mold cavity residing at a cylindrical outer surface of said mold ring, said mold cavity having a plurality of foil molds, each foil mold having a plurality of protrusions or a plurality of depression molds or both a plurality of protrusions and a plurality of depression molds, said mold ring having a runner system fluidly communicating with said mold cavity to facilitate delivery of liquid lead to said mold cavity;
a movable belt having a face situated in confrontation with a circumferential region of said mold cavity of said mold ring, the liquid lead delivered to said mold cavity via said runner system flows between said face of said movable belt and said mold cavity of said mold ring;
a first roller and a second roller, said first and second rollers supporting said movable belt as said movable belt engages and disengages with said mold ring;
a sensing system that monitors a position of said movable belt with respect to said first roller, with respect to said second roller, or with respect to both said first and second rollers; and
at least one actuator engageable with said first roller or with said second roller, said at least one actuator actuatable to move said first roller or said second roller with respect to a frame of the machine in order to adjust the monitored position of said movable belt.

14. The machine as set forth in claim 13, wherein said sensing system is a laser sensing system that tracks the position of said movable belt, and wherein said at least one actuator is a first servomotor and a second servomotor, said first servomotor engageable at a first axial location relative to a shaft of said first roller or of said second roller, and said second servomotor engageable at a second axial location relative to the shaft of said first roller or of said second roller.

15. A method of continuously casting a strip of a plurality of connected bipolar battery foils, the method comprising:
rotating a mold ring about an axis, said mold ring having a mold cavity residing at a cylindrical outer surface of said mold ring, said mold cavity having a plurality of foil molds, each foil mold having a plurality of protrusions or a plurality of depression molds or both a plurality of protrusions and a plurality of depression molds, said mold ring having a runner system fluidly communicating with said mold cavity to facilitate delivery of liquid lead to said mold cavity and to said plurality of foil molds;
moving a belt over a circumferential region of said mold cavity of said mold ring;
supplying liquid lead to said mold cavity via said runner system at said circumferential region;
monitoring a position of said movable belt with respect to a roller of the machine; and
adjusting the position of said movable belt on the roller via at least one actuator engageable with the roller.

16. The method as set forth in claim 15, further comprising:
solidifying the liquid lead supplied in said mold cavity to form a portion of the strip of the plurality of connected bipolar battery foils; and
removing the formed portion of the strip of the plurality of connected bipolar battery foils from said mold cavity.

17. The method as set forth in claim 15, further comprising:
providing a plurality of ribs of said runner system at said mold ring, and wherein supplying liquid lead to said mold cavity is via said plurality of ribs.

18. A method of continuously casting a strip of a plurality of connected bipolar battery foils, the method comprising:
rotating a mold ring about an axis, said mold ring having a mold cavity residing at a cylindrical outer surface of said mold ring, said mold cavity having a plurality of foil molds, each foil mold having a plurality of protrusions or a plurality of depression molds or both a plurality of protrusions and a plurality of depression molds, said mold ring having a runner system fluidly communicating with said mold cavity to facilitate delivery of liquid lead to said mold cavity and to said plurality of foil molds;
moving a belt over a circumferential region of said mold cavity of said mold ring;
supplying liquid lead to said mold cavity via said runner system at said circumferential region;
yieldably biasing a heating shoe into engagement with said movable belt;
yieldably biasing a cooling shoe into engagement with said movable belt; and
moving said heating shoe and said cooling shoe concurrently toward and away from said movable belt via the same carriage assembly.

19. The method as set forth in claim 18, further comprising opposing urging exerted on said mold ring by said heating and cooling shoes via a stabilizer assembly.

20. The method as set forth in claim 18, further comprising applying approximately equivalent forces to said movable belt and said mold ring via said heating shoe and via said cooling shoe.

21. A machine for continuous casting a strip of a plurality of connected battery grids or battery foils, the machine comprising:
- a mold ring rotatable about an axis, said mold ring having a mold cavity residing at a cylindrical outer surface of said mold ring, said mold cavity having a plurality of grid molds or a plurality of foil molds, said mold ring having a runner system fluidly communicating with said mold cavity, said runner system having a plurality of ribs, said runner system and said plurality of ribs facilitating delivery of liquid lead to said mold cavity;
- a movable belt having a face situated in confrontation with a circumferential region of said mold cavity of said mold ring;
- a first roller and a second roller supporting said movable belt in confrontation with said circumferential region of said mold cavity of said mold ring;
- a heating shoe engaging said movable belt adjacent a location in which the liquid lead is delivered to said mold cavity;
- a cooling shoe situated circumferentially next to said heating shoe and engaging said movable belt; and
- a platform carrying both of said heating shoe and said cooling shoe, said platform movable with respect to said mold ring to concurrently bring said heating shoe and said cooling shoe toward and away from said mold ring.

22. The machine as set forth in claim 21, further comprising a stabilizer assembly engaging said mold ring at a circumferential location generally opposed with respect to a location of said heating and cooling shoes.

23. The machine as set forth in claim 21, wherein said platform is a horizontal platform that is movable with respect to a frame of the machine via at least one linear bearing assembly, said heating shoe is carried by a first vertical plate mounted on said horizontal platform, and said cooling shoe is carried by a second vertical plate mounted on said horizontal platform.

24. The machine as set forth in claim 21, further comprising:
- a laser sensing system monitoring a position of said movable belt on said second roller;
- a first servomotor engageable with said second roller to move said second roller with respect to a frame of the machine in order to adjust the monitored position of said movable belt; and
- a second servomotor engageable with said second roller to move said second roller with respect to the frame in order to adjust the monitored position of said movable belt.

* * * * *